(12) United States Patent
Hakkaku et al.

(10) Patent No.: US 11,247,403 B2
(45) Date of Patent: Feb. 15, 2022

(54) APPARATUS FOR MANUFACTURING THREE-DIMENSIONAL OBJECT

(71) Applicant: MIMAKI ENGINEERING CO., LTD., Nagano (JP)

(72) Inventors: Kunio Hakkaku, Nagano (JP); Kosuke Kobayashi, Nagano (JP); Kazuhiro Ochi, Nagano (JP); Kyohei Maruyama, Nagano (JP); Takuya Matsushima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 397 days.

(21) Appl. No.: 15/816,523

(22) Filed: Nov. 17, 2017

(65) Prior Publication Data

US 2018/0147786 A1   May 31, 2018

(30) Foreign Application Priority Data

Nov. 28, 2016   (JP) .............................. JP2016-229787

(51) Int. Cl.
*B29C 64/40* (2017.01)
*B29C 64/209* (2017.01)
(Continued)

(52) U.S. Cl.
CPC ............ *B29C 64/40* (2017.08); *B29C 64/209* (2017.08); *B29C 64/245* (2017.08);
(Continued)

(58) Field of Classification Search
CPC ..... B29C 64/40; B29C 64/209; B29C 64/245; B29C 64/386; B29C 64/112; B33Y 30/00; B33Y 50/02
See application file for complete search history.

(56) References Cited

U.S. PATENT DOCUMENTS

| 2004/0175451 A1* | 9/2004 | Maekawa | ............... B29C 41/36 425/144 |
| 2005/0173855 A1* | 8/2005 | Dunn | .................... B29C 64/40 269/291 |

(Continued)

FOREIGN PATENT DOCUMENTS

| JP | 2004-90530 A | 3/2004 |
| JP | 2016-26915 A | 2/2016 |

(Continued)

OTHER PUBLICATIONS

Extended European Search Report (EESR) dated Apr. 25, 2018 issued in the corresponding European Patent application No. 17203750.9.

(Continued)

*Primary Examiner* — Joseph S Del Sole
*Assistant Examiner* — Mohamed K Ahmed Ali
(74) *Attorney, Agent, or Firm* — Rankin, Hill & Clark LLP

(57) ABSTRACT

Provided is an apparatus for manufacturing a three-dimensional object that may allow a support material to land on a table before a modeling material irrespective of the moving direction of a carriage. The apparatus includes a modeling material head that ejects an ink for object shaping, support material heads that eject an ink for supporting the three-dimensional object, color ink heads that eject color inks, curing units for curing the ejected inks, and a flattening roller unit with a flattening roller used to flatten surfaces of the ejected inks. In the apparatus, one of the curing units, the flattening roller unit, one of the support material heads, the modeling material head, the color ink heads, the other support material head, and the other curing unit are arranged and mounted in the carriage in the mentioned order from one side to the other in the main scanning direction.

20 Claims, 12 Drawing Sheets

(51) Int. Cl.
*B29C 64/245* (2017.01)
*B29C 64/386* (2017.01)
*B29C 64/112* (2017.01)
*B33Y 30/00* (2015.01)
*B33Y 50/02* (2015.01)
*B33Y 70/00* (2020.01)

(52) U.S. Cl.
CPC ............ *B29C 64/386* (2017.08); *B33Y 30/00* (2014.12); *B33Y 50/02* (2014.12); *B29C 64/112* (2017.08); *B29K 2995/002* (2013.01); *B29K 2995/0026* (2013.01); *B33Y 70/00* (2014.12)

(56) References Cited

U.S. PATENT DOCUMENTS

| | | | | |
|---|---|---|---|---|
| 2006/0111807 | A1* | 5/2006 | Gothait | B33Y 30/00 700/119 |
| 2006/0209140 | A1* | 9/2006 | Nagai | B41J 2/16523 347/85 |
| 2009/0219342 | A1* | 9/2009 | Hishida | B41J 3/28 347/51 |
| 2010/0191360 | A1* | 7/2010 | Napadensky | G06T 17/00 700/98 |
| 2011/0109693 | A1* | 5/2011 | Ohnishi | B41J 2/18 347/34 |
| 2011/0285054 | A1* | 11/2011 | Eliahu | G05B 15/02 264/245 |
| 2016/0001505 | A1 | 1/2016 | Hakkaku | |
| 2016/0059482 | A1 | 3/2016 | Hakkaku | |
| 2017/0274586 | A1 | 9/2017 | Hakkaku | |

FOREIGN PATENT DOCUMENTS

JP 2016-47603 A 4/2016
WO 2016031800 A1 3/2016

OTHER PUBLICATIONS

Japanese Office Action (JPOA) dated Aug. 27, 2020 issued in the corresponding JP2016-229787 and its English translation.

* cited by examiner

APPARATUS FOR MANUFACTURING THREE-DIMENSIONAL OBJECT

CROSS REFERENCE TO RELATED APPLICATIONS

This application claims the priority benefit of Japanese Patent Application No. 2016-229787, filed on Nov. 28, 2016. The entirety of the above-mentioned patent application is hereby incorporated by reference herein and made a part of this specification.

TECHNICAL FIELD

This disclosure relates to an apparatus for manufacturing a three-dimensional object.

DESCRIPTION OF THE BACKGROUND ART

There are known 3D shaping printing systems developed to manufacture three-dimensional objects (for example, Japanese Unexamined Patent Publication No. 2016-43618). The 3D shaping printing system described in Japanese Unexamined Patent Publication No. 2016-43618 has a eject unit and a platen on which three-dimensional objects are formable. The eject unit includes a plurality of inkjet heads that eject ink droplets toward the platen, a plurality of ultraviolet light sources, a flattening roller unit, and a carriage mounted with the inkjet heads, ultraviolet light sources, and flattening roller unit.

In this 3D shaping printing system, the inkjet heads of the eject unit include a plurality of color ink heads, a clear ink head, a white ink head, a modeling material head, and a support material head. In the carriage are mounted the ultraviolet light source, flattening roller unit, support material head, modeling material head, white ink head, ultraviolet light source, clear ink head, color ink heads, and ultraviolet light source that are arranged in the mentioned order from one side to the other in a main scanning direction.

SUMMARY

The support material serves to receive the modeling material for an overhanging portion (serves to support the overhanging portion from below). To this end, the support material should desirably be applied before the modeling material in a process to form one ink layer. In the 3D shaping printing system described in Japanese Unexamined Patent Publication No. 2016-43618, the support material head is disposed on one end side alone of the carriage in the main scanning direction. This system may fail to apply the support material before the modeling material depending on the moving direction of the carriage.

This disclosure provides an apparatus for manufacturing a three-dimensional object that may allow a support material to land on a table before a modeling material irrespective of the moving direction of a carriage.

To address the issue of the known art, this disclosure provides an apparatus for manufacturing a three-dimensional object, including: a table on which a three-dimensional object is formable; a modeling material head that ejects an ink for object shaping toward the table; support material heads that eject an ink for supporting the three-dimensional object toward the table; a color ink head that ejects an ink that is colored toward the table; curing units that cure the inks on the table; a flattening roller unit having a flattening roller that flattens surfaces of the inks on the table; and a carriage mounted with the modeling material head, the support material heads, the color ink head, the curing units, and the flattening roller unit. In the carriage are mounted one of the curing units, the flattening roller unit, one of the support material heads, the modeling material head, the color ink head, the other one of the support material heads, and the other one of the curing units that are arranged in the mentioned order from one side to another side in a main scanning direction orthogonal to a vertical direction.

In the three-dimensional object manufacturing apparatus disclosed herein, one of the curing units, the flattening roller unit, one of the support material heads, the modeling material head, the color ink head, the other support material head, and the other curing unit are arranged and mounted in the carriage in the mentioned order from one side to the other in the main scanning direction. Thus, two support material heads are mounted at positions in the carriage on its both end sides, and the modeling material head is interposed between these support material heads. In this apparatus, therefore, the support material (support ink) may land on the table before the modeling material irrespective of the moving direction of the carriage. Further, the support material heads arranged on both end sides of the carriage may allow the support material to land on the table in a stable, well-balanced manner in the main scanning direction.

In this apparatus, the curing unit, flattening roller unit, support material head, and modeling material head are all on one end side of the carriage in the main scanning direction. A three-dimensional object that needs not be colored can be formed by using at least these heads and units alone, except the color ink head, on one end side of the carriage in the main scanning direction. When an uncolored three-dimensional object is formed by this apparatus, it may be the heads and units on one end side in the main scanning direction of the carriage alone that need to be reciprocated above the table in the main scanning direction. In this apparatus, therefore, an uncolored three-dimensional object may be more readily formed with less time. Conventionally, more support material is used to form a three-dimensional object than the modeling material and the color ink. The apparatus disclosed herein with two support material heads in the carriage may be useful in this regard.

In an aspect of this disclosure, the apparatus for manufacturing a three-dimensional object may further include an ink mist adsorbing mechanism that adsorbs ink mist generated when the inks are ejected from the modeling material head, the support material heads, and the color ink head. The ink mist adsorbing mechanism may include: a suctioning fan that suctions the ink mist; and a filter disposed at a position on a traveling path of the ink mist suctioned by the suctioning fan. The ink mist adsorbing mechanism may be mounted in the carriage. This may prevent the ink mist from adhering to nozzle surfaces of the he modeling material head, support material heads, and color ink head.

In another aspect of this disclosure, the apparatus for manufacturing a three-dimensional object may further include: a table support that supports the table in a manner that the table is movable upward and downward; and a lifting mechanism that moves the table upward and downward relative to the table support. The table may include: an object-shaping table having an upper surface on which the three-dimensional object is formable; and an object-shaping table holder that holds the object-shaping table. The object-shaping table holder may be supported by the table support so as to move upward and downward. The object-shaping table may be detachably attached to the object-shaping table holder. In the apparatus thus further characterized, the object-shaping table and the completed three-dimensional object thereon may be removed altogether from the apparatus. The three-dimensional object may be removed from the apparatus by removing the object-shaping table from the object-shaping table holder after the object is completed. This may avoid possible damage to the three-dimensional object that could occur if the object was directly held and removed from the apparatus. For example, a robot may be used to mechanically remove the three-dimensional object from the apparatus.

In the apparatus according to yet another aspect of this disclosure, the object-shaping table may have a flat rectangular shape and include a reinforcing rib formed in a grid-like or honeycomb fashion on a lower surface of the object-shaping table. The reinforcing rib may impart a required strength to the object-shaping table even after any parts of this table but a rib-formed part are reduced in thickness. This may allow for weight reduction of the object-shaping table without compromising the strength required of the object-shaping table. As a result, the object-shaping table may be easily removable from the object-shaping table holder.

In yet another aspect of this disclosure, the apparatus for manufacturing a three-dimensional object may further include a moving mechanism that moves the table toward a front side in a front-rear direction until a position is reached at which the table is located more toward the front side than the carriage. The front-rear direction is a direction orthogonal to the vertical direction and the main scanning direction. Conventionally, a three-dimensional object completed by such an apparatus is pulled upward and then removed from the apparatus. In the apparatus disclosed herein thus further characterized, the completed three-dimensional object may be more easily pulled upward and out of the apparatus. By simply moving the table toward the front side during the manufacture of the three-dimensional object, a user can directly look at the three-dimensional object still uncompleted and check its current progress.

The moving mechanism may be configured to move the table in the front-rear direction during the manufacture of the three-dimensional object. The apparatus with the moving mechanism thus characterized may be structurally simplified, as compared to the apparatus being equipped with two separate moving mechanisms; one for moving the table to a position at which the table is located more toward the front side than the carriage, and the other for moving the table in the front-rear direction during the manufacture of the three-dimensional object.

In yet another aspect of this disclosure, the apparatus for manufacturing a three-dimensional object may further include: a table support that supports the table in a manner that the table is movable upward and downward; a lifting mechanism that moves the table upward and downward relative to the table support; and a moving mechanism that moves the table support in the front-rear direction. The front-rear direction is a direction orthogonal to the vertical direction and the main scanning direction.

In yet another aspect of this disclosure, the apparatus for manufacturing a three-dimensional object may further include: a shape detecting mechanism that detects a shape of the three-dimensional object currently formed; and a controller programmed to control the apparatus. During the manufacture of the three-dimensional object, the controller may compare the shape of the three-dimensional object, which is currently formed and specified based on a detection result of the shape detecting mechanism, to design data of the three-dimensional object, and the controller may halt the apparatus when the controller determines that the three-dimensional object is not shaped according to the design data. These additional features may allow the apparatus to automatically continue to form or cease to form the three-dimensional object depending on the shape of the object currently formed and specified based on the detection result of the shape detecting mechanism. Thus, the apparatus disclosed herein may be configured as an automatically operable apparatus. Japanese Unexamined Patent Publication No. 2016-43618 is silent about an automated operation of the 3D shaping printing system.

The shape detecting mechanism may be mounted in the carriage.

In yet another aspect of this disclosure, the apparatus for manufacturing a three-dimensional object may further include a telemeter mountable in the carriage. The telemeter may measure a distance in the vertical direction between the telemeter and an upper surface of the table.

In yet another aspect of this disclosure, the apparatus for manufacturing a three-dimensional object may further include: a carriage driving mechanism that moves the carriage in the main scanning direction; a moving mechanism that moves the table in the front-rear direction; and a lifting mechanism that moves the table upward and downward. Before the three-dimensional object starts to be formed, the carriage driving mechanism may move the carriage in the main scanning direction, the moving mechanism may move the table in the front-rear direction, the telemeter may measure distances in the vertical direction between the telemeter and a plurality of positions on the upper surface of the table, and the lifting mechanism may move the table upward or downward based on a measurement result of the telemeter to set a height of the upper surface of the table at the time of starting to form the three-dimensional object. The apparatus thus further characterized may allow the upper surface of the table to be located at a most appropriate position in height to start to form the three-dimensional object.

In yet another aspect of this disclosure, the apparatus for manufacturing a three-dimensional object may further include: a carriage driving mechanism that moves the carriage in the main scanning direction; a moving mechanism that moves the table in the front-rear direction; and at least three lifting mechanisms that move the table upward and downward. Before the three-dimensional object starts to be formed, the carriage driving mechanism may move the carriage in the main scanning direction, the moving mechanism may move the table in the front-rear direction, the telemeter may measure distances in the vertical direction between the telemeter and a plurality of positions on the upper surface of the table, and the at least three lifting mechanisms may each independently move the table upward or downward based on a measurement result of the telemeter to correct inclination of the upper surface of the table relative to a horizontal plane at the time of starting to form the three-dimensional object. In three-dimensional object manufacturing apparatuses, a base for a three-dimensional object may be conventionally formed on the upper surface of the table from the support material to lessen any impact from undulation of the table's upper surface. On the upper surface of the table, the base is formed so that its upper surface is parallel to the horizontal plane. The lifting mechanisms each independently move the table upward or downward based on the measurement result of the telemeter so as to correct inclination of the upper surface of the table relative to the horizontal plane at the time of starting to form the three-dimensional object. In the apparatus thus further characterized, the base formed on the upper surface of the table may be reduced in thickness and accordingly formed more quickly, in contrast to any apparatus lacking such a mechanism to correct inclination of the table's upper surface relative to the horizontal plane.

In yet another aspect of this disclosure, the apparatus for manufacturing a three-dimensional object may further include: a plurality of ink collecting tanks in which at least the inks removed from the flattening roller are collectible; an ink level detecting mechanism that detects ink levels in the plurality of ink collecting tanks; and a changeover valve to which the plurality of ink collecting tanks are coupled through piping. The changeover valve may change one of ink collecting paths to another ink collecting path based on a detection result of the ink level detecting mechanism so as to have the inks collected in one of the plurality of ink collecting tanks. When the ink collecting tanks are replaced with empty ones in the apparatus thus further characterized, more time may be invested before all of the empty tanks are filled up with the inks. This may allow for less frequent replacement of the ink collecting tanks and accordingly facilitate maintenance of the apparatus. During the replacement of one of the ink collecting tanks, the apparatus may continue to form the three-dimensional object using the other ink collecting tank.

In the apparatus for manufacturing a three-dimensional object, the modeling material head may at least include a head that ejects a white ink or a head that ejects a clear ink.

In the apparatus characterized as described thus far, the support material may land on the table before the modeling material irrespective of the moving direction of the carriage.

DETAILED DESCRIPTION OF EMBODIMENTS

Embodiment

An embodiment of this disclosure is hereinafter described in detail with reference to the accompanying drawings.

[Three-Dimensional Object Manufacturing Apparatus: Schematic Structure]

Figure 1:
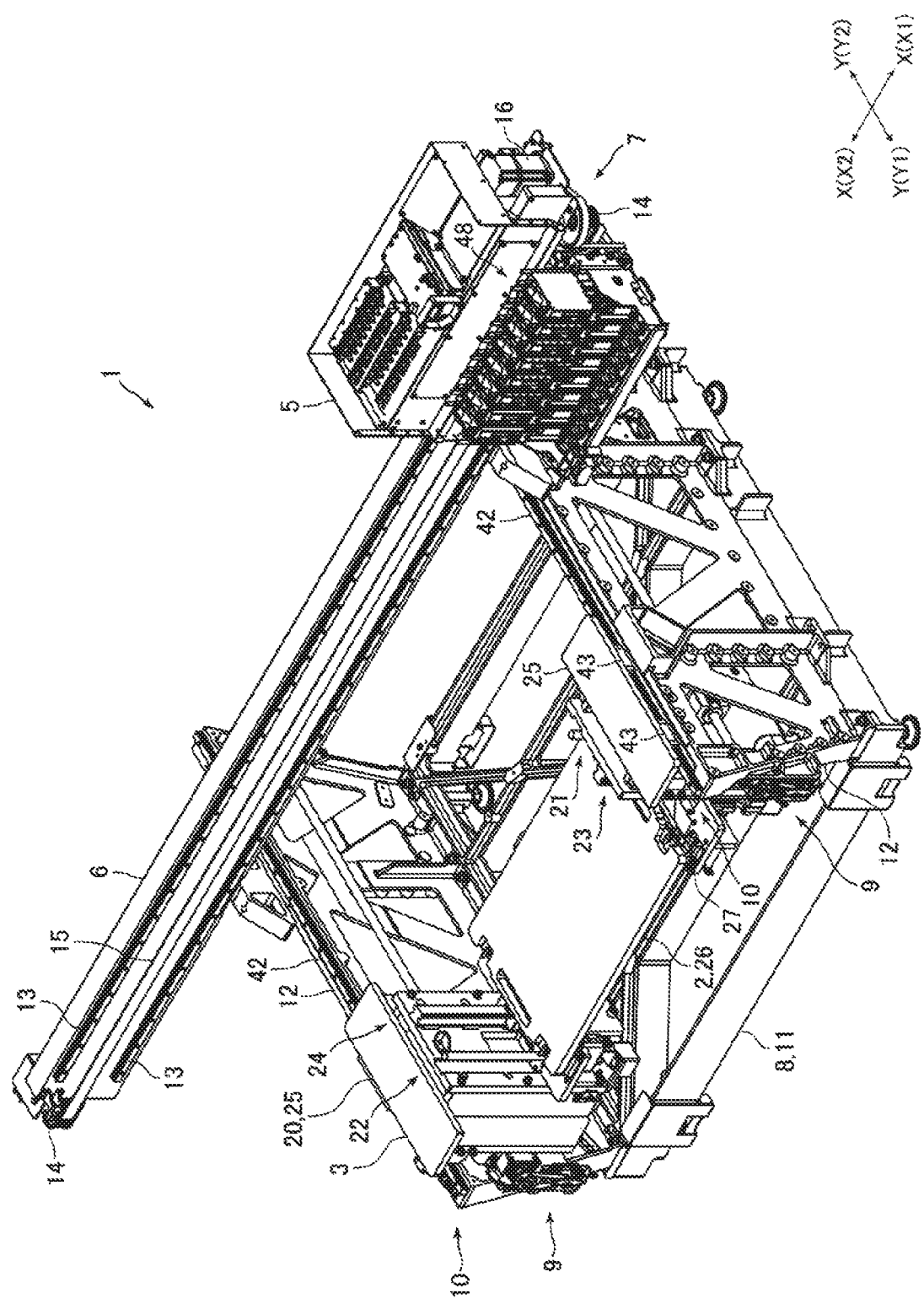
FIG. 1 is a perspective view of an apparatus for manufacturing a three-dimensional object according to an embodiment of this disclosure.
Figure 2:
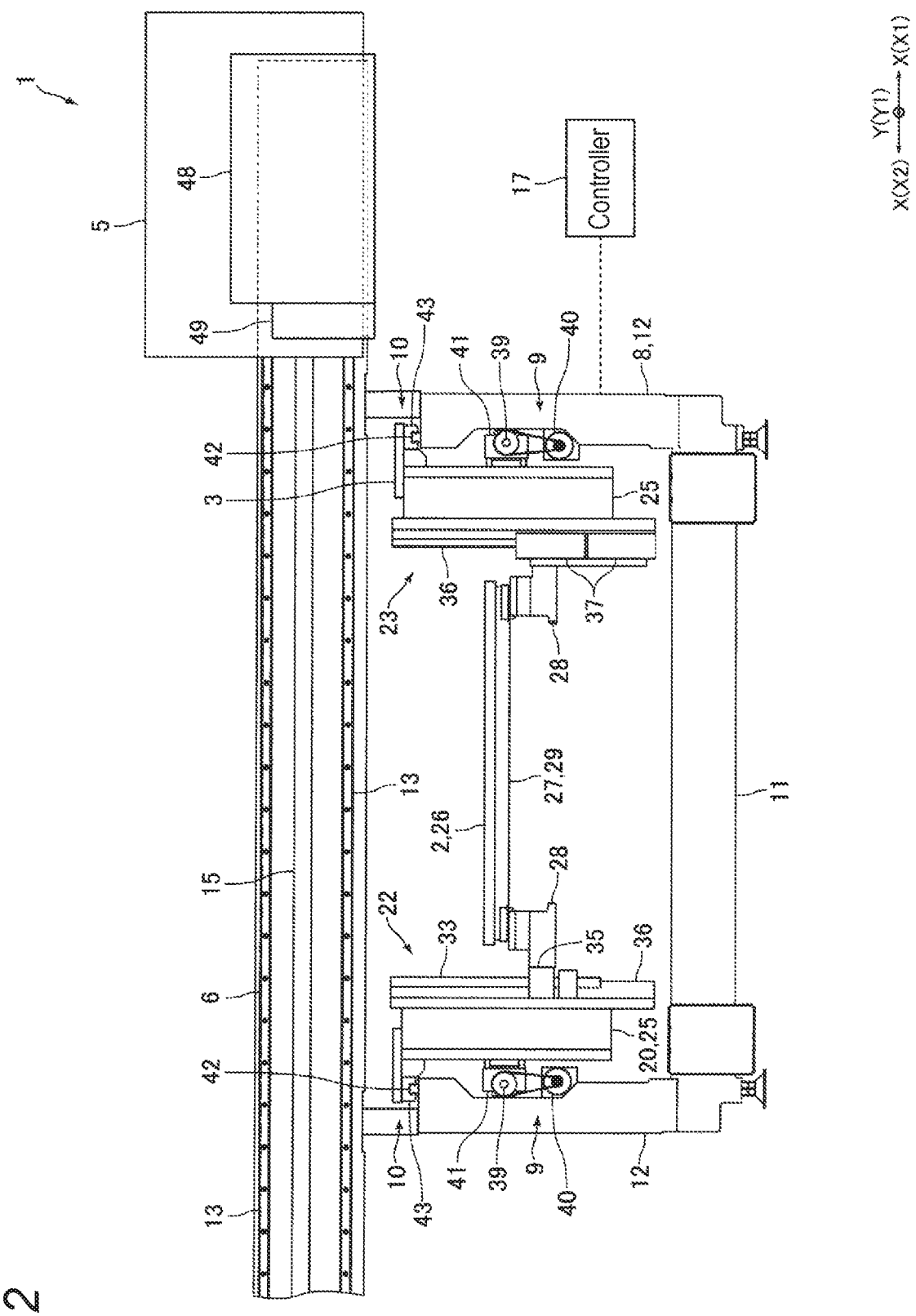
FIG. 2 is a schematic front view of the apparatus illustrated in FIG. 1.

FIG. 1 is a perspective view of a three-dimensional object manufacturing apparatus 1 according to an embodiment of this disclosure. FIG. 2 is a schematic front view of the three-dimensional object manufacturing apparatus 1 illustrated in FIG. 1.

The three-dimensional object manufacturing apparatus 1 according to this embodiment is an inkjet printer for industrial use to manufacture three-dimensional objects. The three-dimensional object manufacturing apparatus 1 has a stage 3 with a table 2 on which a three-dimensional object is formable, and a carriage 5 mounted with inkjet heads 51 to 58, described later, from which ink droplets are ejected toward the table 2.

The three-dimensional object manufacturing apparatus 1 further has a suspending frame 6 that holds the carriage 5 in a manner that the carriage 5 is movable in a main scanning direction orthogonal to a vertical direction, a carriage driving mechanism 7 that drives the carriage 5 to move on the suspending frame 6 in the main scanning direction, a body frame 8 that holds the stage 3 in a manner that the stage 3 is movable in a sub scanning direction orthogonal to the main scanning direction, stage driving mechanisms 9 that drive the stage 3 to move in the sub scanning direction relative to the body frame 8, and guiding mechanisms 10 that guide the stage 3 in the sub scanning direction. The three-dimensional object manufacturing apparatus 1 has a cabinet (not illustrated in the drawings) in which these structural elements are housed. The three-dimensional object manufacturing apparatus 1 further has a controller 17 programmed to control the three-dimensional object manufacturing apparatus 1.

In the description given below, "left-right direction" refers to the main scanning direction (X direction in FIG. 1 and the like), and "front-rear direction" refers to the sub scanning direction (Y direction in FIG. 1 and the like). Further, "front" side refers to one of directions included in the front-rear direction (Y1 direction), "rear" side refers to the other direction included in the front-rear direction (Y2 direction), "right" side refers to one of directions included in the left-right direction (X1 direction), and "left" side refers to the other direction included in the left-right direction (X2 direction).

The body frame 8 has a bottom member 11 and two side members 12 rising upward from left and right ends of the bottom member 11. The suspending frame 6 has a thin and long cuboidal shape with its longitudinal axis extending in the left-right direction. The suspending frame 6 is secured to the side members 12. The suspending frame 6 is located above rear end parts of the side members 12. The carriage 5 supported by the suspending frame 6 is located above the stage 3. The carriage 5 is, therefore, disposed above the table 2.

To the front surface of the suspending frame 6 are secured two guide rails 13 that guide the carriage 5 in the left-right direction. The guide rails 13 are secured to the suspending frame 6, so that the longitudinal direction of each guide rail 13 is coincident with the left-right direction. The two guide rails 13 secured to the suspending frame 6 are spaced apart at a predetermined interval in the vertical direction. A guide block (not illustrated in the drawings) engageable with the guide rails 13 is secured to the carriage 5.

As illustrated in FIG. 1, the carriage driving mechanism 7 has two pulleys 14, a belt 15 hung across the pulleys 14, and a motor 16 that rotates the pulleys 14. The two pulleys 14 are fitted to the suspending frame 6 so as to rotate around a rotating axis extending in the vertical direction. The two pulleys 14 are respectively attached to left and right ends of the suspending frame 6. The belt 15 is partly secured to the carriage 5. The motor 16 is attached to the right end side of the suspending frame 6. The motor 16 is coupled to the pulley 14 attached to the right end of the suspending frame 6 with a predetermined power transmitting mechanism interposed therebetween. By driving the motor 16, the carriage 5 is moved in the left-right direction along the guide rails 13.

[Stage]

Figure 3:
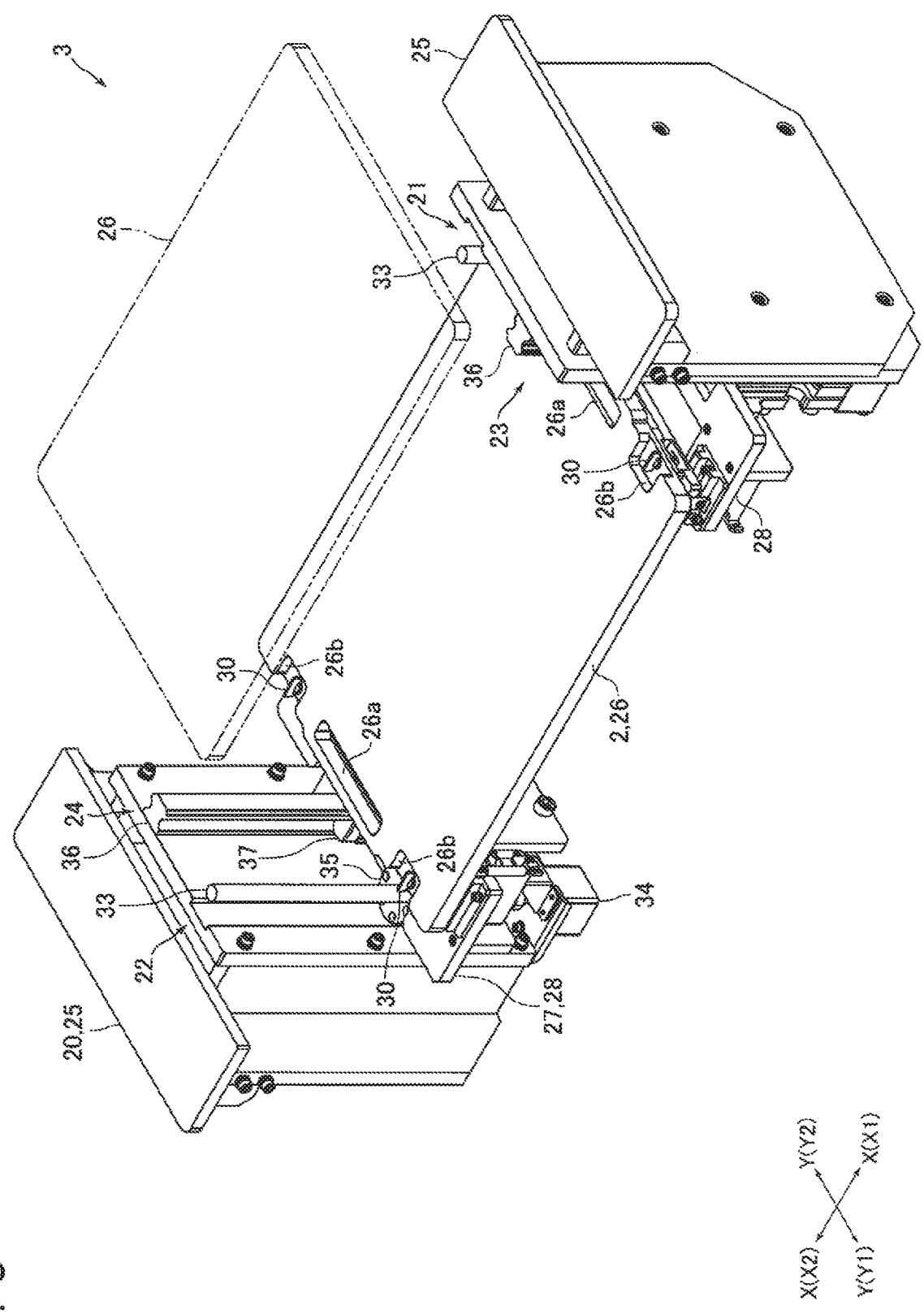
FIG. 3 is a perspective view of a stage illustrated in FIG. 1.
Figure 4:
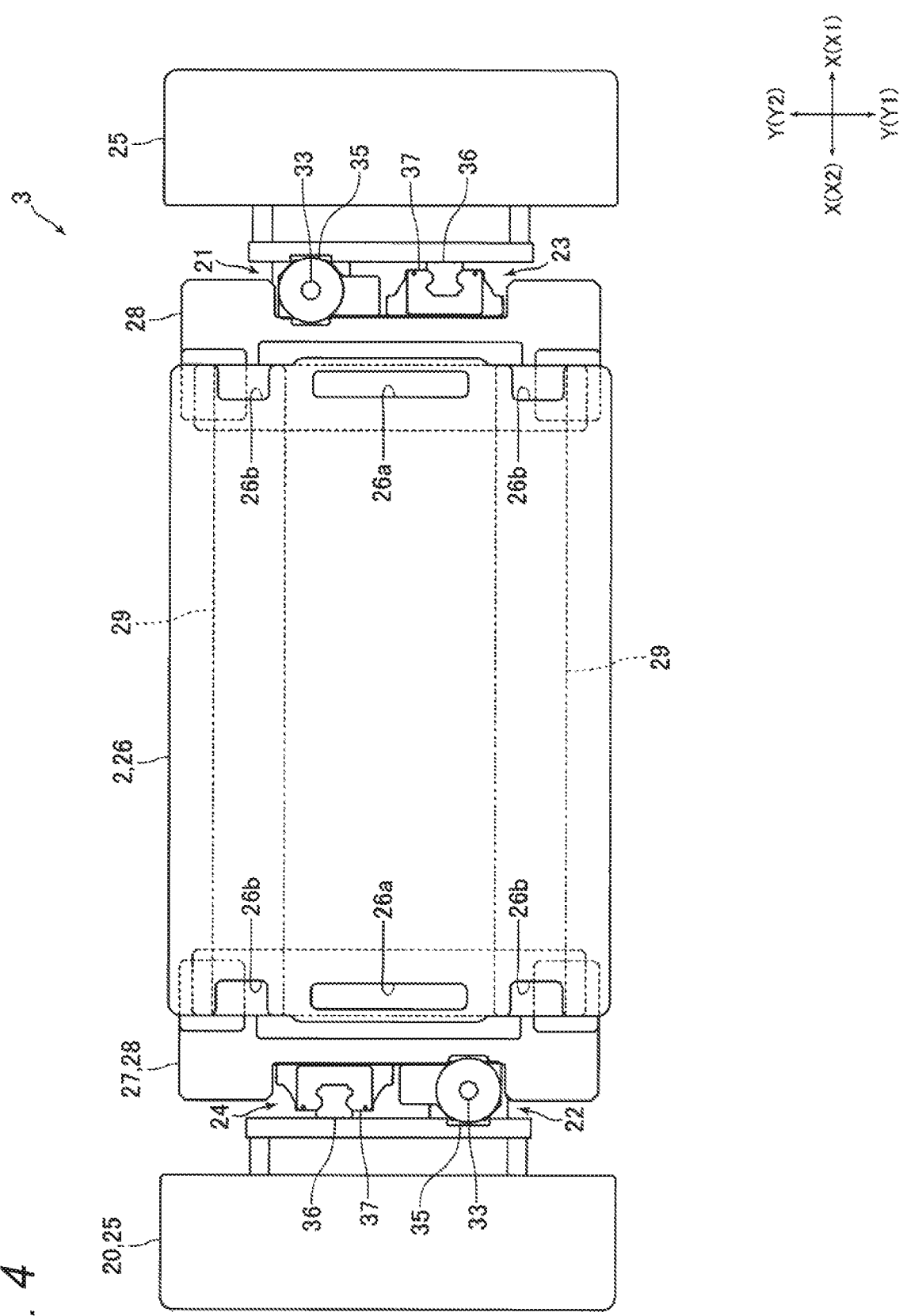
FIG. 4 is a schematic plan view of the stage illustrated in FIG. 1.

FIG. 3 is a perspective view of the stage 3 illustrated in FIG. 1. FIG. 4 is a schematic plan view of the stage 3 illustrated in FIG. 1.

The stage 3 is disposed at a position above the bottom member 11 and between the two side members 12 in the left-right direction. The stage 3 has, in addition to the table 2, a stage frame 20; an example of the table support, two lifting mechanisms 21 and 22, and two guiding mechanisms 23 and 24. The stage frame 20 supports the table 2 in a manner that the table 2 is movable upward and downward. The lifting mechanisms 21 and 22 move the table 2 upward and downward relative to the stage frame 20. The guiding mechanisms 23 and 24 guide the table 2 in the vertical direction.

The stage frame 20 has two side members 25 constituting left and right side parts of the stage frame 20. The two side members 25 are coupled with a coupling member not illustrated in the drawings. The table 2 is disposed between the two side members 25 in the left-right direction. The table 2 has an object-shaping table 26 having a flat rectangular shape, and an object-shaping table holder 27. The object-shaping table holder 27 supports the object-shaping table 26 and is supported by the stage frame 20 so as to move upward and downward. The object-shaping table 26 is detachably attached to the object-shaping table holder 27. The object-shaping table holder 27 has two side members 28 constituting left and right end parts of the table 2, and two coupling member 29 by which the two side members 28 are coupled with each other (see FIG. 4).

The upper surface of the object-shaping table 26 is a flat surface substantially orthogonal to the vertical direction. The three-dimensional object is formed on the upper surface of the object-shaping table 26. The object-shaping table 26 is positioned so that, among four end surfaces of its rectangular shape, two end surfaces parallel to each other are parallel to the front-rear direction and the other two end surfaces parallel to each other are parallel to the left-right direction. The object-shaping table 26 is made of an aluminum alloy, and its upper surface has been subjected to an aluminum anodizing process. On the upper surfaces of the side members 28 are formed mounting planes that are orthogonal to the vertical direction. The left and right end parts of the object-shaping table 26 are mounted on these mounting planes.

The object-shaping table 26 mounted on the mounting planes are secured to the object-shaping table holder 27 with screws 30 (see FIG. 3). The screws 30 are fitted in, for example, left, right, front, and rear end parts of the object-shaping table 26. By disengaging the screws 30 from the object-shaping table 26, the object-shaping table 26 may be removed from the object-shaping table holder 27 in the upper direction, as illustrated with a two-dot chain line in FIG. 3. The object-shaping table 26 has through cavities 26a formed at its left and right ends. These cavities are used to grip the object-shaping table 26 when removed from the object-shaping table holder 27. At left and right end parts on the upper surface of the object-shaping table 26, recesses 26b are formed to receive heads of the screws 30. The screws 30 are not shown in FIG. 4.

The lifting mechanisms 21 and 22 each have a lead screw 33 rotatably held by the stage frame 20, a motor 34 (see FIG. 3) that rotates the lead screw 33, and a nut member 35 attached to the table 2 and engageable with the lead screw 33. The two lifting mechanisms 21 and 22 can be independently driven. The guiding mechanisms 23 and 24 each have a guide rail 36 attached to the stage frame 20, and a guide block 37 attached to the table 2 and engageable with the guide rail 36. The guiding mechanisms 23 and 24 according to this embodiment may be LM guides (registered trademark) with ball retainers embedded in the guide blocks 37.

As illustrated in FIG. 4, the lifting mechanism 21 and the guiding mechanism 23 are disposed at positions on the right end side of the table 2. The lifting mechanism 21 and the guiding mechanism 23 are arranged in an aligned manner in the front-rear direction. Further, the lifting mechanism 21 and the guiding mechanism 23 are adjacently arranged at positions in vicinity to center of the table 2 in the front-rear direction. In this embodiment, the lifting mechanism 21 is disposed at a position more rearward than the guiding mechanism 23. The lifting mechanism 22 and the guiding mechanism 24 are disposed at positions on the left end side of the table 2. The lifting mechanism 22 and the guiding mechanism 24 are arranged in an aligned manner in the front-rear direction. Further, the lifting mechanism 22 and the guiding mechanism 24 are adjacently disposed at positions in vicinity to center of the table 2 in the front-rear direction. In this embodiment, the guiding mechanism 24 is disposed at a position more rearward than the lifting mechanism 22.

A distance in the front-rear direction between the lifting mechanism 21 and the guiding mechanism 23 is equal to a distance in the front-rear direction between the lifting mechanism 22 and the guiding mechanism 24. Specifically, a distance in the front-rear direction between the center of the lead screw 33 of the lifting mechanism 21 and the center of the guide rail 36 of the guiding mechanism 23 is equal to a distance in the front-rear direction between the center of the lead screw 33 of the lifting mechanism 22 and the center of the guide rail 36 of the guiding mechanism 24. The lifting mechanism 21 is disposed at a position slightly more rearward than the guiding mechanism 24 in the front-rear direction. The guiding mechanism 23 is disposed at a position slightly more rearward than the lifting mechanism 22 in the front-rear direction.

The lead screws 33 are rotatably supported by inner surfaces of the two side members 25 in the left-right direction, so that axial directions of the lead screws 33 are coincident with the vertical direction. The motors 34 are secured to lower end sides of the two side members 25. The output shafts of the motors 34 are coupled to lower end parts of the lead screws 33. The nut members 35 are attached to outer surfaces of the two side members 28 in the left-right direction. The guide rails 36 are secured to inner surfaces of the two side members 25 in the left-right direction, so that the longitudinal direction of each guide rail 36 is coincident with the vertical direction. The guide blocks 37 are attached to outer surfaces of the two side members 28 in the left-right direction.

[Stage Driving Mechanism and Guiding Mechanism]

The stage driving mechanisms 9 and the guiding mechanisms 10 are disposed on both sides of the stage 3 in the left-right direction. The stage driving mechanisms 9 each have a lead screw 39 rotatably attached to the side member 12, a motor 40 that rotates the lead screw 39, and a nut member 41 attached to the stage 3 and engageable with the lead screw 39. The guiding mechanisms 10 each have a guide rail 42 attached to the side member 12, and a guide block 43 attached to the stage 3 and engageable with the guide rail 42.

The lead screws 39 are rotatably supported by inner surfaces of the two side members 12 in the left-right direction, so that axial directions of the lead screws 39 are coincident with the front-rear direction. The motors 40 are secured to inner surfaces of the two side members 12 in the left-right direction. The motors 40 are secured to front end parts of the side members 12. The output shafts of the motors 40 are coupled to front end parts of the lead screws 39 with the use of pulleys and belts. The nut members 41 are attached to outer surfaces of the two side members 25 in the left-right direction. With the nut members 41 being attached to the stage frame 20, the stage driving mechanisms 9 move the stage frame 20 in the front-rear direction. The stage driving mechanisms 9 in this embodiment move the table 2 and the stage frame 20 in the front-rear direction.

The guide rails 42 are secured to upper end surfaces of the side members 12, so that the longitudinal direction of each guide rail 42 is coincident with the front-rear direction. The guide blocks 43 are secured to upper end sides of the side members 25 in the stage frame 20. These guide blocks 43 are each engaged with the guide rail 42 from its upper side.

In this embodiment, the stage 3 is allowed to move forward to a position at which the whole stage 3 is ahead of the carriage 5, as illustrated in FIG. 1. This means that the table 2 is allowed to move forward until a position is reached at which the table 2 is located ahead of the carriage 5. The stage driving mechanisms 9 move the table 2 in the front-rear direction during the manufacture of the three-dimensional object. The stage driving mechanisms 9 move the table 2 to the front end of the three-dimensional object manufacturing apparatus 1 at the time of removing the completed three-dimensional object from the three-dimensional object manufacturing apparatus 1. When the completed three-dimensional object is removed from the three-dimensional object manufacturing apparatus 1, the stage driving mechanisms 9 move the table 2 to a position at which the table 2 is located more toward the front side than the carriage 5, so that the table 2 sticks out of the three-dimensional object manufacturing apparatus 1 toward its front side. The cabinet of the three-dimensional object manufacturing apparatus 1 has an opening through which the completed three-dimensional object is removable.

[Carriage]

Figure 5:
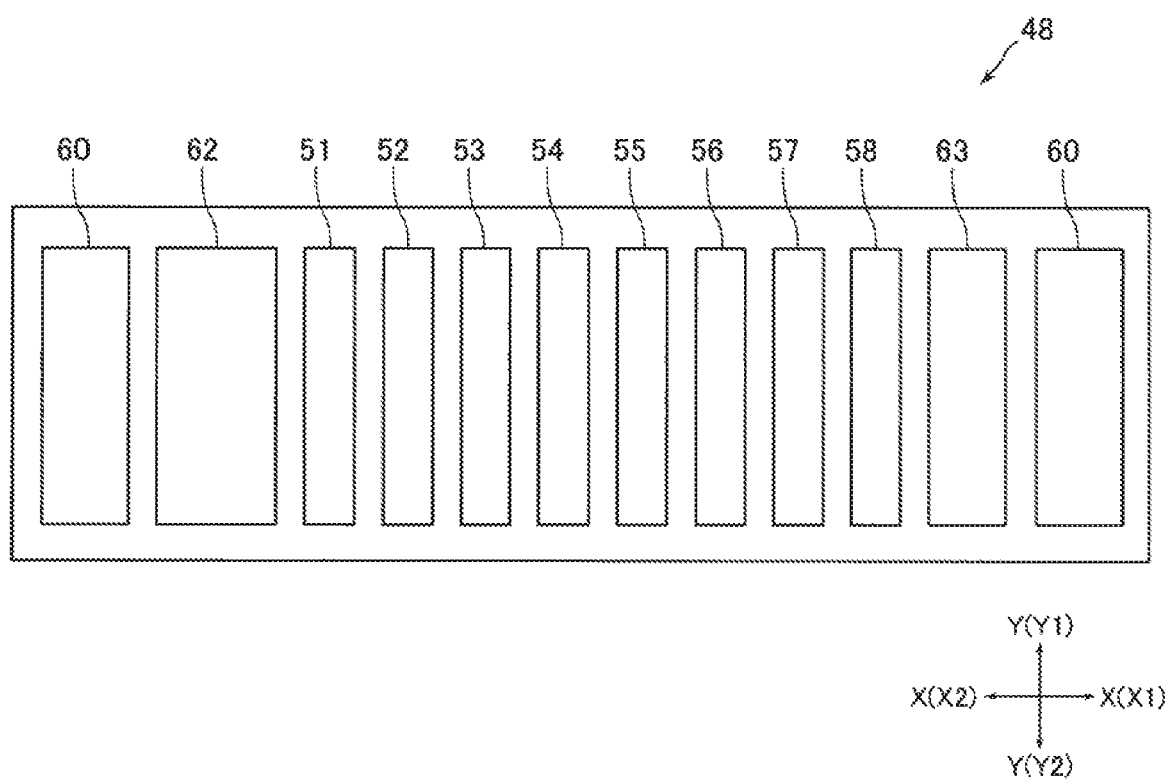
FIG. 5 is a bottom view, illustrating a eject unit mounted in a carriage illustrated in FIG. 1.
Figure 6:
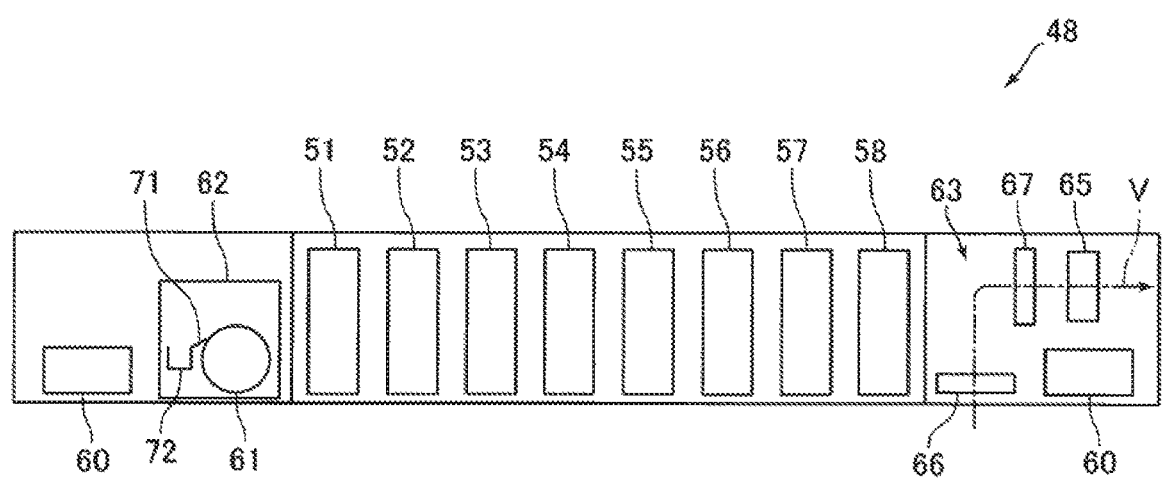
FIG. 6 is a front view, illustrating the eject unit illustrated in FIG. 5.
Figure 7:
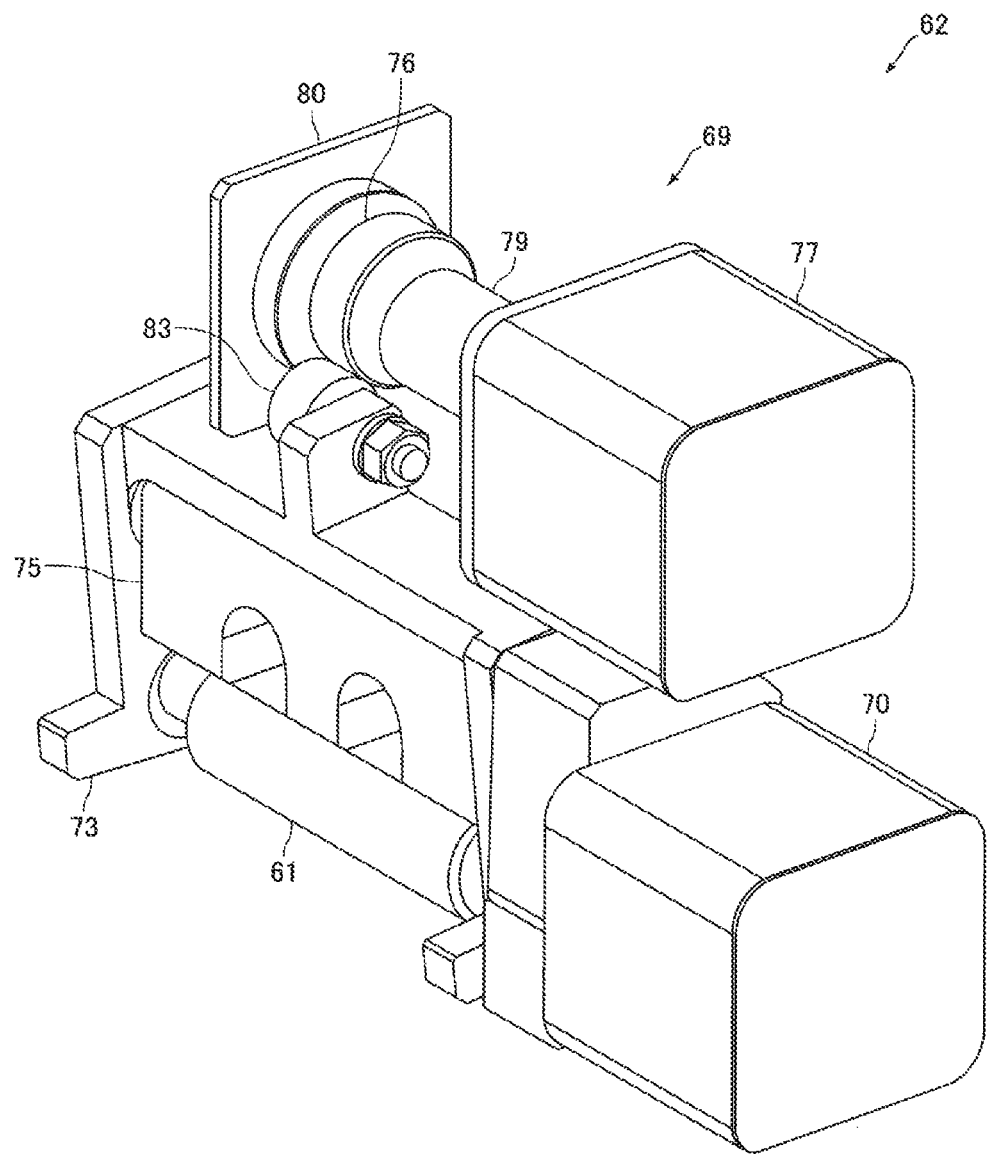
FIG. 7 is a perspective view in part of a flattening roller unit illustrated in FIG. 5.
Figure 8A:
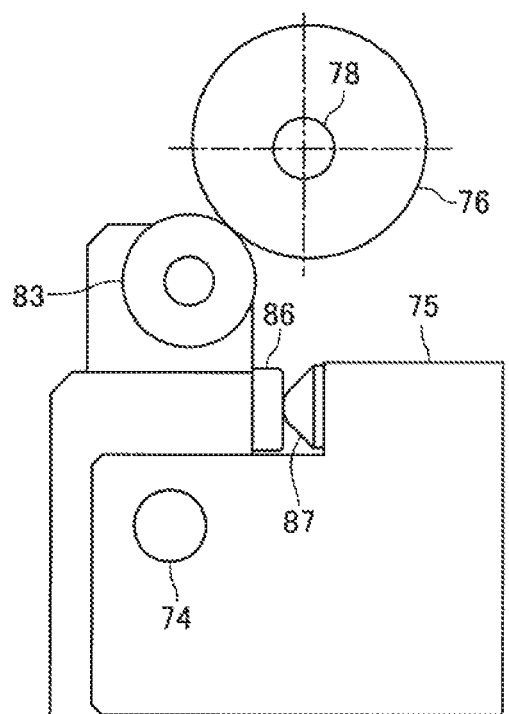
FIGS. 8A and 8B are front views, illustrating the flattening roller unit illustrated in FIG. 7 and its operation.
Figure 8B:
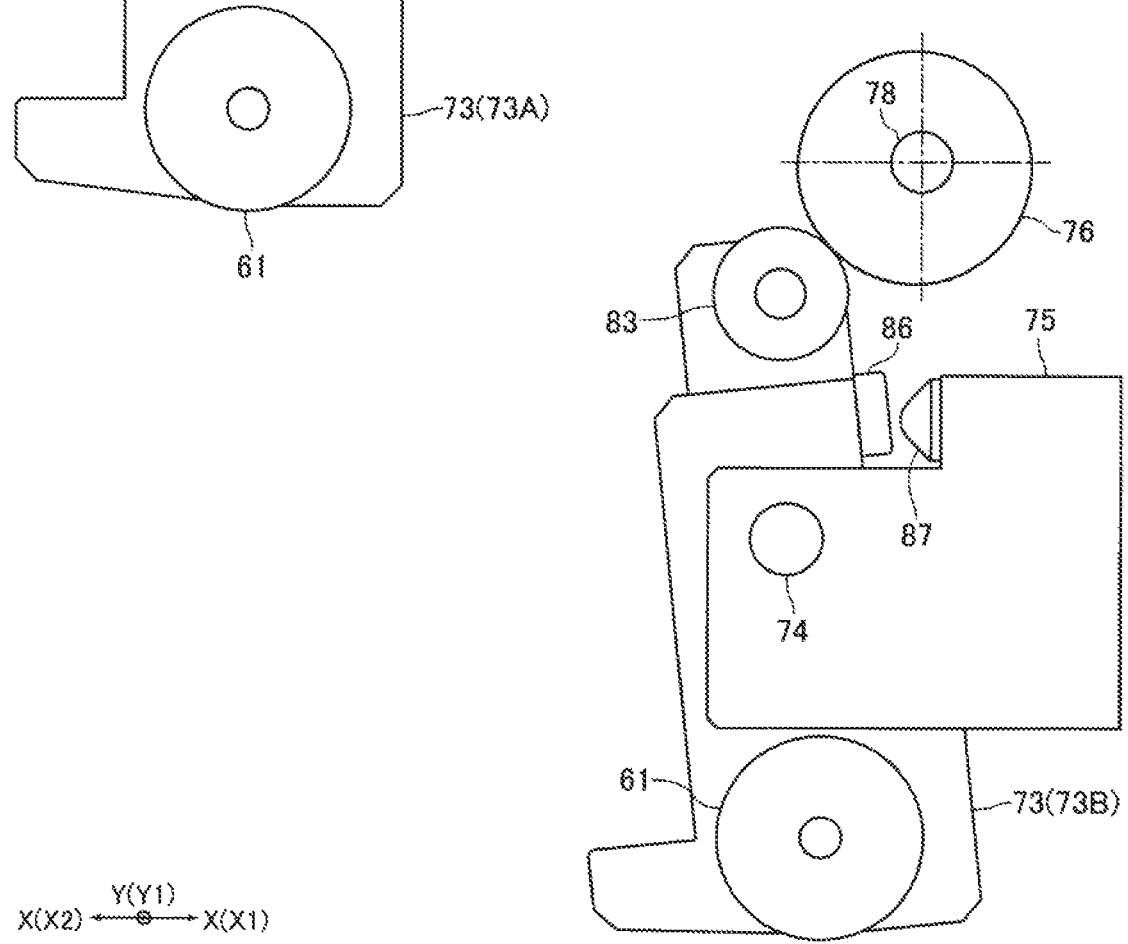
Figure 9:
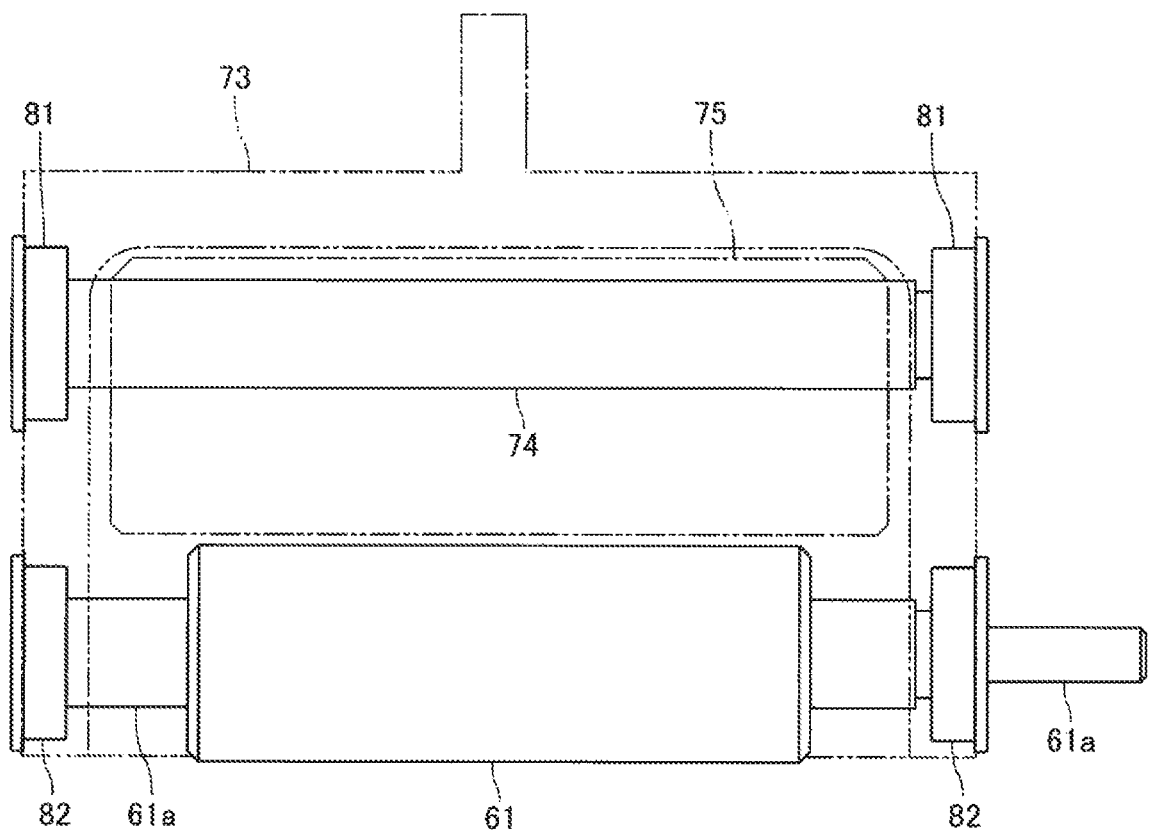
FIG. 9 is a side view, illustrating supports of a flattening roller and supports of a roller holding member illustrated in FIG. 7.

FIG. 5 is a bottom view, illustrating a eject unit 48 mounted in the carriage 5 illustrated in FIG. 1. FIG. 6 is a front view, illustrating the eject unit 48 illustrated in FIG. 5. FIG. 7 is a perspective view in part of a flattening roller unit 62 illustrated in FIG. 5. FIGS. 8A and 8B are front views, illustrating the flattening roller unit 62 illustrated in FIG. 7 and its operation. FIG. 9 is a side view, illustrating supports of a flattening roller 61 and supports of a roller holding member 73 illustrated in FIG. 7.

The carriage 5 is mounted with the eject unit 48 used to form a three-dimensional object. The carriage 5 is further mounted with a laser telemeter 49; an example of the telemeter (see FIG. 2). The eject unit 48 has a plurality of inkjet heads 51 to 58 from which ink droplets are ejected toward the table 2. In this embodiment, the eject unit 48 has eight inkjet heads 51 to 58. The inkjet heads 51 to 58 are disposed, so that the ink droplets ejected are directed downward. The inkjet heads 51 to 58 eject ultraviolet-curable inks.

The eject unit 48 further has ultraviolet irradiators 60; an example of the curing unit. The ultraviolet irradiators 60 radiate ultraviolet light to cure the ultraviolet-curable inks ejected from the inkjet heads 51 to 58 and dropped on the table 2. In this embodiment, the eject unit 48 has two ultraviolet irradiators 60. The eject unit 48 has a flattening roller unit 62 and an ink mist adsorbing mechanism 63. The flattening roller unit 62 has a flattening roller 61 that flattens surfaces (upper surfaces) of ink droplets ejected from the inkjet heads 51 to 58 toward the table 2. The ink mist adsorbing mechanism 63 adsorbs ink mist generated when the inks are ejected from the inkjet heads 51 to 58.

The carriage 5 is mounted with these structural elements of the eject unit 48; eight inkjet heads 51 to 58, two ultraviolet irradiators 60, flattening roller unit 62, and ink mist adsorbing mechanism 63. In the carriage 5 are mounted, from left to right in the mentioned order, ultraviolet irradiator 60, flattening roller unit 62, inkjet head 51, inkjet head 52, inkjet head 53, inkjet head 54, inkjet head 55, inkjet head 56, inkjet head 57, inkjet head 58, and ultraviolet irradiator 60. The ink mist adsorbing mechanism 63 is disposed at a position above the rightmost ultraviolet irradiator 60 and between the rightmost inkjet head 60 and the inkjet head 58.

The inkjet heads 51 and 58 are support material heads that eject inks for supporting a three-dimensional object (support materials). The inkjet head 52 is a modeling material head that ejects an ink for object shaping (modeling material). The ink ejected from the inkjet head 52 is an ink having light reflectivity (white ink) which is an essential element in subtractive color mixture. This ink reflects light transmitted through process inks (color inks) described later. The inkjet head 53 is a clear ink head that ejects a transparent ink (clear ink). This inkjet head may eject the clear ink for object shaping (modeling material) to form a three-dimensional object having transparency at least in part, eject the clear ink between the light-reflective (white) ink and the process ink (color ink) described later to prevent intermixing of the inks, or eject the clear ink to form a protective layer on the outermost side of a three-dimensional object. The inkjet heads 54 to 57 are color ink heads that eject the process inks (color inks) for subtractive color mixture. In this embodiment, the inkjet head 54 ejects a yellow ink, the inkjet head 55 ejects a cyan ink, the inkjet head 56 ejects a magenta ink, and the inkjet head 57 ejects a black ink.

Examples of the ultraviolet irradiator 60 may include UVLED, metal halide lamp, and mercury lamp. The ultraviolet irradiators 60 radiate ultraviolet light downward. The ultraviolet irradiators 60 in this embodiment are UVLEDs.

The ink mist adsorbing mechanism 63 has a suctioning fan 65 that suctions the ink mist, and two filters 66 and 67 that are disposed at positions on the traveling path of the ink mist suctioned by the suctioning fan 65 (see FIG. 6). The suctioning fan 65 is disposed above the rightmost ultraviolet irradiator 60. The filter 66 is disposed between the rightmost ultraviolet irradiator 60 and the inkjet head 58. The filter 67 is disposed on the left of the suctioning fan 65. An inlet for air including the ink mist is formed below the filter 66. An air outlet is formed on the right of the suctioning fan 65. When the suctioning fan 65 is driven in the ink mist adsorbing mechanism 63, air including the ink mist suctioned through the inlet below the filter 66 travels through the filter 66 and then the filter 67, and is ejected out of the outlet on the right of the suctioning fan 65, as illustrated with arrow V in FIG. 6.

The flattening roller unit 62 has a roller lifting mechanism 69 that moves the roller 61 upward and downward relative to the carriage 5 (see FIG. 7), and a motor 70 that rotates the flattening roller 61. The flattening roller unit 62 further has a blade 71 and an ink collecting unit 72 (see FIG. 6). The blade 71 is used to remove any ink adhered to the flattening roller 61 when the roller 61 flattens surfaces of the ejected ink droplets on the table 2. The ink collecting unit 72 is used to collect the ink removed by the blade 71 from the surface of the flattening roller 61.

The roller lifting mechanism 69 is mounted in the carriage 5. The roller lifting mechanism 69 has a roller holding member 73, a support shaft 74, a holding frame 75, an eccentric cam 76, and a motor 77. The roller holding member 73 rotatably holds the flattening roller 61. The support shaft 74 oscillatably supports the roller holding member 73. The holding frame 75 holds the support shaft 74. The eccentric cam 76 oscillates the roller holding member 73 relative to the holding frame 75. The motor 77 rotates the eccentric cam 76. The roller lifting mechanism 69 further has a rotating shaft 78 (see FIGS. 8A and 8B) to which the eccentric cam 76 is fixable. The holding frame 75 and the motor 77 are secured to the carriage 5.

The rotating shaft 78 is disposed so as to have its axial direction coincide with the front-rear direction. One end (front end) of the rotating shaft 78 is coupled to the output shaft of the motor 77 with the use of a coupling 79 (see FIG. 7). The other end (rear end) of the rotating shaft 78 is rotatably supported by a support member 80. The support member 80 is secured to the holding frame 75. The eccentric cam 76 has a disc-like-shape. The eccentric cam 76 is secured to the rotating shaft 78 with its axial center being displaced from the axial center of the rotating shaft 78.

The support shaft 74 is disposed so as to have its axial direction coincide with the front-rear direction. The support shaft 74 is secured to the holding frame 75. Both ends of the support shaft 74 are projecting more outward in the front-rear direction than the holding frame 75. As illustrated in FIG. 9, two bearings 81 are attached to the roller holding member 73 to support both ends of the support shaft 74. These bearings 81 allow the roller holding member 73 to oscillate relative to the holding frame 75 around an axis extending in the front-rear direction. The bearings 81 are roller bearings.

The flattening roller 61 is disposed so as to have its axial direction coincide with the front-rear direction. The flattening roller 61 is disposed below the support shaft 74. As described earlier, the flattening roller unit 62 is disposed on the right of the leftmost ultraviolet irradiator 60 of the eject unit 48. The flattening roller 61 is adjacent in the left-right direction to the leftmost ultraviolet irradiator 60 of the eject unit 48. In the carriage 5, the leftmost ultraviolet irradiator 60 of the eject unit 48 is mounted in the carriage 5 in adjacency to the flattening roller 61 in the left-right direction.

As illustrated in FIG. 9, two bearings 82 are attached to the roller holding member 73, and supports 61a formed at both ends of the flattening roller 61 are supported by these bearings 82. The bearings 82 allow the flattening roller 61 to rotate relative to the roller holding member 73 around a rotating axis extending in the front-rear direction. The bearings 82 are roller bearings. The motor 70, blade 71, and ink collecting unit 72 are secured to the roller holding member 73 and are allowed to oscillate with the flattening roller 61 and the roller holding member 73 relative to the holding frame 75. The output shaft of the motor 70 is coupled to the flattening roller 61 with the use of a gear not illustrated in the drawings.

A cam follower 83 that makes contact with the eccentric cam 76, which in the form of a roller, is rotatably attached to the upper end side of the roller holding member 73. The cam follower 83 is attached to the roller holding member 73 so as to rotate around a rotating axis extending in the front-rear direction. The cam follower 83 is disposed above the support shaft 74. Specifically, the cam follower 83 is disposed substantially immediately above the support shaft 74. The cam follower 83 is disposed at a position below and to the left of the eccentric cam 76 in contact with a lower left part of the eccentric cam 76. To make the cam follower 83 contact the eccentric cam 76, the roller holding member 73, centering on the support shaft 74, is biased clockwise in FIGS. 8A and 8B by a spring member not illustrated in the drawings.

When the eccentric cam 76 rotates, the roller holding member 73, centering on the support shaft 74, oscillates to and from a contact position (position in FIG. 8A) 73A and a retreat position (position in FIG. 8B) 73B. At the contact position 73A, the flattening roller 61 is allowed to contact surfaces (upper surfaces) of the ink droplets. At the retreat position 73B, the flattening roller 61 retreats to a position above the ink droplet surfaces. Thus, the eccentric cam 76 induces the roller holding member 73 to oscillate to and from the contact position 73A and the retreat position 73B. An amount of vertical movement of the flattening roller 61 (difference between heights of the flattening roller 61 when the roller holding member 73 is at the contact position 73A and at the retreat position 73B) may be approximately 0.1 mm to 0.3 mm. When the roller holding member 73 is at the contact position 73A, the flattening roller 61 is right below the support shaft 74.

In this embodiment, when the eccentric cam 76 rotates, the roller holding member 73 at the retreat position 73B moves downward and to the left toward the contact position 73A. When the eccentric cam 76 rotates, the roller holding member 73 at the contact position 73A moves upward and to the right toward the retreat position 73B. The flattening roller 61 is disposed on the right of the leftmost ultraviolet irradiator 60 of the eject unit 48. When the roller holding member 73 moves from the contact position 73A to the retreat position 73B, the flattening roller 61 moves away from the leftmost ultraviolet irradiator 60 of the eject unit 48. When the roller holding member 73 is at the retreat position 73B, the flattening roller 61 is at a position further away from the leftmost ultraviolet irradiator 60 of the eject unit 48 than when the roller holding member 73 is at the contact position 73A.

As illustrated in FIGS. 8A and 8B, the roller lifting mechanism 69 has stopper members 86 and 87 that locate the roller holding member 73 at the contact position 73A. The stopper members 86 and 87 are disposed above the support shaft 74. Specifically, the stopper members 86 and 87 are disposed at positions above and to the right of the support shaft 74. The stopper members 86 and 87 are disposed below the cam follower 83. The stopper member 86 is secured to the roller holding member 73, while the stopper member 87 is secured to the holding frame 75. The stopper member 86 is disposed on the left of the stopper member 87. When the roller holding member 73 is at the contact position 73A, the stopper member 86 contacts the stopper member 87 from its left side.

The laser telemeter 49 is disposed at a position adjacent to the eject unit 48 in the left-right direction. The laser telemeter 49 radiates laser light downward. The laser telemeter 49 is configured to measure a distance in the vertical direction between the laser telemeter 49 and the upper surface of the table 2. Specifically, the laser telemeter 49 is configured to measure a distance in the vertical direction between the laser telemeter 49 and the upper surface of the object-shaping table 26. The laser telemeter 49 further measures distances in the vertical direction between the laser telemeter 49 and different positions on the upper surface of a three-dimensional object currently formed to detect the current shape of the three-dimensional object. The laser telemeter 49 in this embodiment is a shape detecting mechanism that detects the shape of the three-dimensional object currently formed.

In this embodiment, before a three-dimensional object starts to be formed, the carriage driving mechanism 7 moves the carriage 5 in the left-right direction, the stage driving mechanisms 9 move the table 2 in the front-rear direction, and the laser telemeter 49 measures distances in the vertical direction between the laser telemeter 49 and different positions on the upper surface of the table 2. For example, the laser telemeter 49 may measure distances in the vertical direction between the laser telemeter 49 and four positions on the upper surface of the table 2. The lifting mechanisms 21 and 22 move the table 2 upward or downward based on a measurement result of the laser telemeter 49 to set the initial height of the upper surface of the table 2 (i.e., height of the upper surface of the object-shaping table 26) when the three-dimensional object starts to be formed. Specifically, the lifting mechanisms 21 and 22 move the table 2 upward or downward, so that a position on the upper surface of the table 2 closest to the laser telemeter 49 (highest position of the upper surface of the table 2) is slightly below the lower end of the flattening roller 61 when the roller holding member 73 is at the contact position 73A to set the initial height of the upper surface of the table 2 when the three-dimensional object starts to be formed.

In this embodiment, during the manufacture of the three-dimensional object, the controller 17 of the three-dimensional object manufacturing apparatus 1 compares the shape of the three-dimensional object, which is currently formed and specified based on the measurement result of the laser telemeter 49, to the design data of the three-dimensional object. When the three-dimensional object currently formed is shaped according to the design data, the controller 17 prompts the three-dimensional object manufacturing apparatus 1 to continue to form the three-dimensional object. Otherwise, the controller 17 suspends the operation of the three-dimensional object manufacturing apparatus 1.

The carriage 5 moves in the left-right direction along the guide rails 13. In this embodiment, the position of the carriage 5 at right ends of the guide rails 13 is the home position of the carriage 5. In the operation of the three-dimensional object manufacturing apparatus 1 to form a three-dimensional object, the carriage 5 moves to the left from the home position, and the inkjet heads 51 to 58 eject the ink droplets. At the time, the roller holding member 73 is at the retreat position 73B.

When the carriage 5 that has moved to the left end side returns to the right, the roller holding member 73 moves to the contact position 73A. Then, the flattening roller 61 flattens the ink droplet surfaces. When the carriage 5 moves rightward, the roller holding member 73 is at the contact position 73A. To flatten the ink droplet surfaces, the flattening roller 61 rotates counterclockwise in FIGS. 6 and 8. The flattening roller unit 62 may be equipped with a locking mechanism for locking the flattening roller 61 when the carriage 5 is at the home position.

[Ink Circulating Mechanism and Ink Collecting Mechanism]

Figure 10:
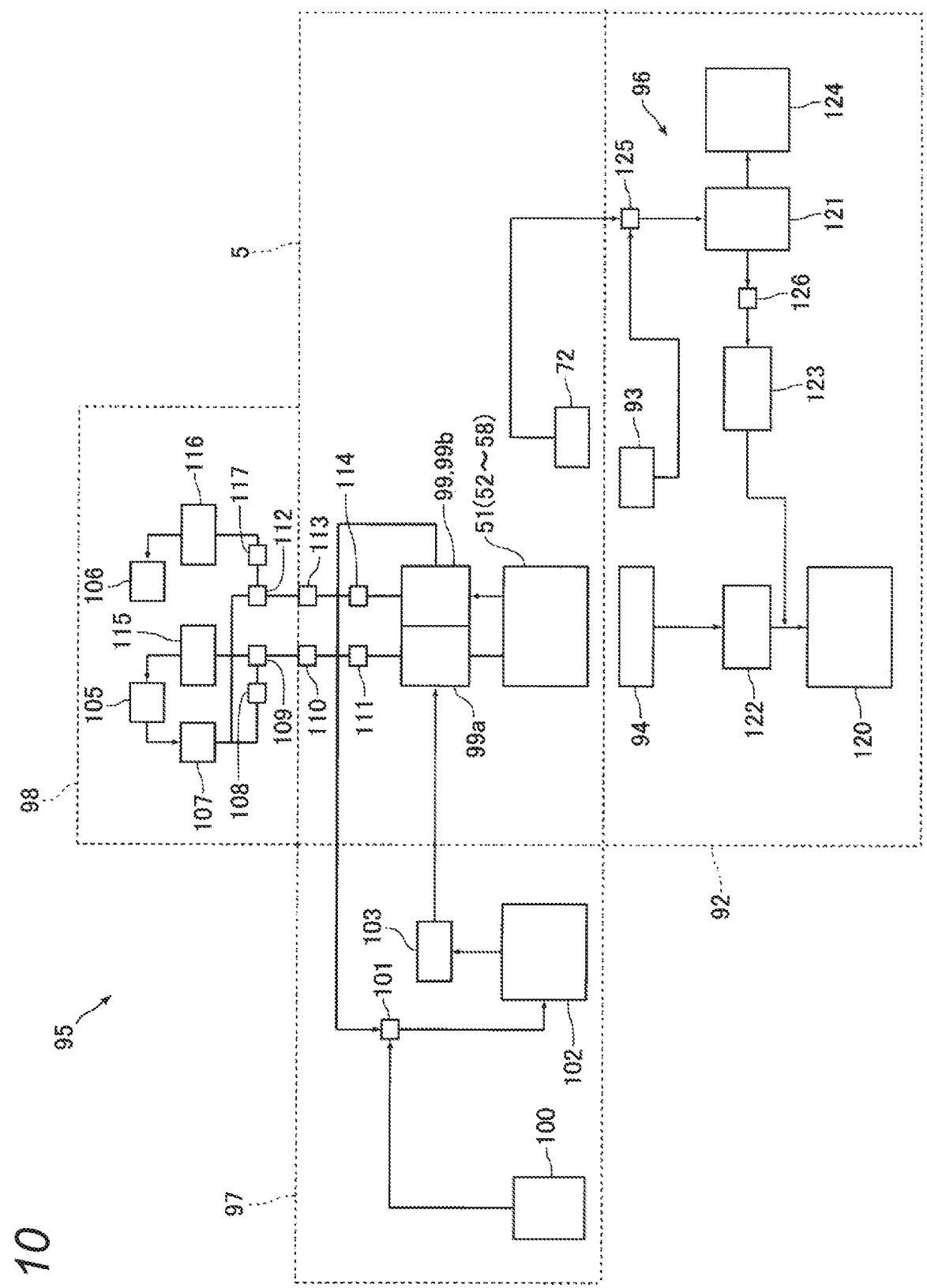
FIG. 10 is a block diagram, illustrating an ink circulating mechanism and an ink collecting mechanism of the apparatus illustrated in FIG. 1.

FIG. 10 is a block diagram, illustrating an ink circulating mechanism 95 and an ink collecting mechanism 96 of the three-dimensional object manufacturing apparatus illustrated in FIG. 1.

The three-dimensional object manufacturing apparatus 1 is equipped with a maintenance unit 92 that prevents nozzles of the inkjet heads 51 to 58 from being clogged with inks. The maintenance unit 92 has a wiper, an ink collecting unit 93, and a cap 94. The wiper is used to wipe off any ink adhered to nozzle surfaces of the inkjet heads 51 to 58. The ink collecting unit 93 is used to collect the ink wiped off by the wiper. The cap 94 has a suctioning mechanism that suctions any ink left in nozzles of the inkjet heads 51 to 58. The maintenance unit 92 may be disposed below the carriage 5 at the home position. The suctioning mechanism of the cap 94 may be dispensable, in which case the ink droplets are ejected toward the cap 94 from the inkjet heads 51 to 58 during maintenance of these inkjet heads.

The three-dimensional object manufacturing apparatus 1 according to this embodiment has an ink circulating mechanism 95, and an ink collecting mechanism 96. The ink circulating mechanism 95 is used to circulate the inks inside the inkjet heads 51 to 58. The ink collecting mechanism 96 is used to collect the inks collected by the ink collecting units 72 and 93 and suctioned by the cap 94.

The ink circulating mechanism 95 has an ink feeder 97, an air controller 98, and sub tanks 99. The ink feeder 97 feeds the inkjet heads 51 to 58 with inks. The air controller 98 controls a pneumatic pressure for circulation of the inks. The sub tanks 99 are mounted in the carriage 5. The sub tanks 99 are each coupled to a respective one of the eight inkjet heads 51 to 58. Thus, the ink circulating mechanism 95 has eight sub tanks 99. The sub tanks 99 each have an upstream liquid chamber 99a and a downstream liquid chamber 99b. The outlets of the liquid chambers 99a are coupled to the inlets of the inkjet heads 51 to 58. The inlets of the liquid chambers 99b are coupled to the outlets of the inkjet heads 51 to 58.

The ink feeder 97 has ink tanks 100. The ink tank 100 is coupled to the suction port of an ink pump 102 through a valve 101. The eject port of the ink pump 102 is coupled to the inlet of the liquid chamber 99a with a filter 103 interposed therebetween. The outlet of the liquid chamber 99b is coupled to the valve 101. The ink tanks 100 for the inkjet heads 54 to 57 (color ink tanks) have a capacity smaller than the capacity of the ink tanks 100 for the inkjet heads 51 to 53 and 58 (support ink tank, modeling ink tank, clear ink tank). The ink tanks 100 for the inkjet heads 54 to 57 have the capacity of 1 liter, and the ink tank 100 for the inkjet heads 51 to 53 and 58 have the capacity of 3.5 liters.

The air controller 98 has an upstream pressure pump 105, and a downstream pressure pump 106. The eject port of the pressure pump 105 is coupled to the liquid chamber 99a through an air chamber 107, valves 108 to 110, and a filter 111. The eject port of the pressure pump 105 is coupled to the liquid chamber 99b through the air chamber 107, valves 112 and 113, and a filter 114. An air chamber 115 is coupled to the suction port of the pressure pump 105 and to the valve 109. An air chamber 116 is coupled to the suction port of the pressure pump 106 and to the valve 112 through a valve 117. Air flow paths between the pressure pump 105 and the valves 108 and 112 have positive pressures, while air flow paths between the pressure pump 105 and the valve 109 and between the pressure pump 106 and the valve 117 have negative pressures.

The ink collecting mechanism 96 has a waste liquid tank 120; an example of the ink collecting tank, a waste liquid buffer 121, liquid feed pumps 122 and 123, and a vacuum pump 124. The suction port of the liquid feed pump 122 is coupled to the cap 94. The waste liquid tank 120 is coupled to the eject port of the liquid feed pump 122. The waste liquid buffer 121 is coupled to the ink collecting units 72 and 93 through a valve 125. The suction port of the liquid feed pump 123 is coupled to the waste liquid buffer 121 through a valve 126. The waste liquid tank 120 is coupled to the eject port of the liquid feed pump 123. The vacuum pump 124 is coupled to the waste liquid buffer 121.

[Major Effects of this Embodiment]

In this embodiment, the inkjet heads in the carriage 5 are arranged as follows; the inkjet heads 51 and 58 that eject the support material are disposed at positions on both end sides of the carriage 5 in the left-right direction, and the inkjet head 52 that ejects the modeling material is disposed at a position between the inkjet heads 51 and 58. This arrangement of the inkjet heads may allow the support material to land on the table 2 before the modeling material irrespective of the moving direction of the carriage 5. Further, the inkjet heads 51 and 58 arranged on both end sides of the carriage 5 may allow the support material to land on the table 2 in a stable, well-balanced manner in the left-right direction.

In this embodiment, the ultraviolet irradiator 60, flattening roller unit 62, and inkjet heads 51 to 53 are disposed at positions on the left end side of the carriage 5. When an uncolored three-dimensional object is formed by the apparatus according to this embodiment, it may be the inkjet heads and units on one end side of the carriage 5 alone that need to be reciprocated above the table 2 in the left-right direction. In this apparatus, therefore, an uncolored three-dimensional object may be more readily formed with less time.

In this embodiment, when the three-dimensional object completed is removed from the three-dimensional object manufacturing apparatus 1, the table 2 is moved to a position more toward the front side of the three-dimensional object manufacturing apparatus 1 than the carriage 5. In this embodiment, therefore, the completed three-dimensional object may be more easily pulled upward and out of the three-dimensional object manufacturing apparatus 1. By simply moving the table 2 toward the front side during the manufacture of the three-dimensional object, a user can directly look at the object still uncompleted and check its current progress.

In this embodiment, the object-shaping table 26 is detachably attached to the object-shaping table holder 27. After the three-dimensional object is completed, therefore, the object-shaping table 26 and the three-dimensional object formed thereon may be removed altogether from the three-dimensional object manufacturing apparatus 1. By removing the object-shaping table 26 from the object-shaping table holder 27 after the three-dimensional object is completed, the three-dimensional object may be removed from the three-dimensional object manufacturing apparatus 1. This may avoid possible damage to the three-dimensional object that would occur if the object was directly held and removed from the three-dimensional object manufacturing apparatus 1.

In this embodiment, the stage driving mechanisms 9 move the table 2 in the front-rear direction during the manufacture of a three-dimensional object, and also move the table 2 to the front end of the three-dimensional object manufacturing apparatus 1 at the time of removing the completed three-dimensional object from the three-dimensional object manufacturing apparatus 1. The three-dimensional object manufacturing apparatus 1 according to this embodiment, therefore, may be structurally simplified, as compared to the apparatus being equipped with two separate moving mechanisms; one for moving the table 2 in the front-rear direction during the manufacture of the three-dimensional object, and the other for moving the table 2 to the front end of the three-dimensional object manufacturing apparatus 1 to remove the three-dimensional object.

In this embodiment, before a three-dimensional object starts to be formed, the carriage driving mechanism 7 moves the carriage 5 in the left-right direction, the stage driving mechanisms 9 move the table 2 in the front-rear direction, the laser telemeter 49 measures distances in the vertical direction between the laser telemeter 49 and different positions on the upper surface of the table 2, and the lifting mechanisms 21 and 22 move the table 2 upward or downward based on the measurement result of the laser telemeter 49 to set the height of the upper surface of the table 2 at the time of starting to form the three-dimensional object. The apparatus according to this embodiment may allow the upper surface of the table 2 to be located at a most appropriate position in height to start to form the three-dimensional object.

In the three-dimensional object manufacturing apparatus 1 according to this embodiment, during the manufacture of the three-dimensional object, the controller 17 compares the shape of the three-dimensional object, which is currently formed and specified based on the detection result of the laser telemeter 49, to the design data of the three-dimensional object. The controller 17 allows the three-dimensional object manufacturing apparatus 1 to continue to operate when determined that the three-dimensional object is shaped according to the design data, whereas the controller 17 suspends the operation of the three-dimensional object manufacturing apparatus 1 when determined that the object is not shaped according to the design data. Depending on the shape of the three-dimensional object currently formed and specified based on the detection result of the laser telemeter 49, the three-dimensional object manufacturing apparatus 1 automatically continues to form or ceases to form the three-dimensional object. Thus, the three-dimensional object manufacturing apparatus 1 may be configured as an automatically operable apparatus.

Another Embodiment

Figure 11:
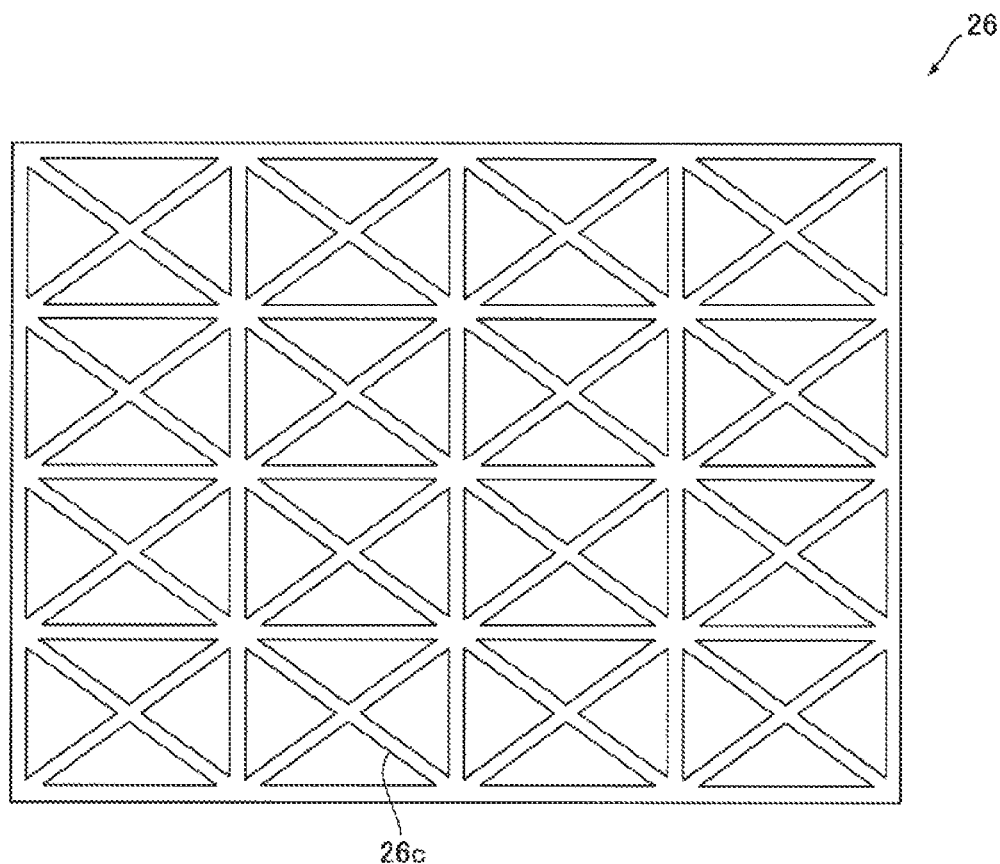
FIG. 11 is a bottom view of an object-shaping table according to another embodiment of this disclosure.

The apparatus according to the earlier embodiment may further include a reinforcing rib 26c formed in a grid-like or honeycomb fashion on the lower surface (back surface) of the object-shaping table 26, as illustrated in FIG. 11. The reinforcing rib 26c may impart a required strength to the object-shaping table 26 even after any parts of this table but a rib-formed part are reduced in thickness. This may allow for weight reduction of the object-shaping table 26 without compromising the strength required of the object-shaping table 26. As a result, the object-shaping table 26 may be easily removable from the object-shaping table holder 27. In the earlier embodiment, the object-shaping table 26 is detachably attached to the object-shaping table holder 27. Instead, the object-shaping table 26 may be integral with the object-shaping table holder 27 or may be secured by welding to the object-shaping table holder 27.

While the object-shaping table 26 is secured to the object-shaping table holder 27 with screws 30 in the earlier embodiment, the object-shaping table 26 may not necessarily be secured to the object-shaping table holder 27. Instead, a plurality of positioning pins projecting upward may be formed on or secured to the mounting planes of the side members 28, and through holes for the positioning pins to be inserted may be formed on the object-shaping table 26. In this structure, the object-shaping table 26 is mounted on the mounting planes, with the positioning pins being inserted in the through holes. When a completed three-dimensional object is removed from the three-dimensional object manufacturing apparatus 1 thus structured, the object-shaping table 26 and the three-dimensional object formed thereon may be altogether removed by detaching the object-shaping table 26 by a robot from the object-shaping table holder 27 of the table 2 moved to the front end of the apparatus. The use of a robot may allow the three-dimensional object to be mechanically removed from the three-dimensional object manufacturing apparatus 1. The robot may transport the object-shaping table 26 removed from the object-shaping table holder 27 (object-shaping table 26 with the three-dimensional object thereon) to a predetermined shelf. Then, the robot may transport the empty object-shaping table 26 from the shelf to the object-shaping table holder 27 and attaches the transported object-shaping table 26 to the object-shaping table holder 27.

Figure 12:
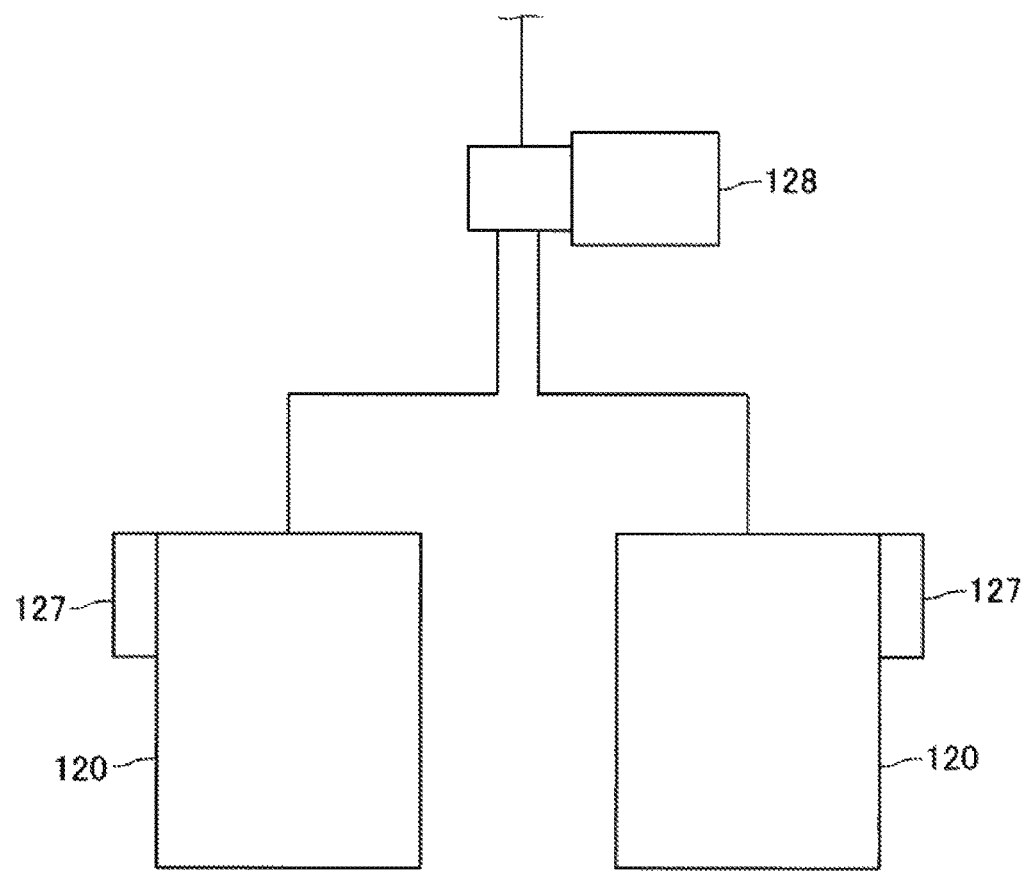
FIG. 12 is a block diagram, illustrating an ink collecting mechanism according to another embodiment of this disclosure.

In the apparatus according to the earlier embodiment, the ink collecting mechanism 96 may be equipped with a plurality of waste liquid tanks 120. As illustrated in FIG. 12, the ink collecting mechanism 96 may have two waste liquid tanks 120. In that case, an ink level detecting mechanism 127, such as a level meter that detects the ink level in the waste liquid tank 120, may be attached to each of the waste liquid tanks 120. A changeover valve 128 may be interposed between the two waste liquid tanks 120 and the liquid feed pumps 122 and 123. An example of the changeover valve 128 is an electromagnetic valve. The two waste liquid tanks 120 are coupled to the changeover valve 128 through piping.

One of the two waste liquid tanks 120 is coupled to the liquid feed pumps 122 and 123 through the changeover valve 128 so as to have the ink collected by the waste liquid tank 120 coupled to the liquid feed pumps 122 and 123. When the ink level detecting mechanism 127 attached to one of the waste liquid tanks 120 detects that the ink level in this tank 120 has reached a predetermined level, the changeover valve 128 changes an ink collecting path currently selected to another ink collecting path so as to have the ink collected by the other waste liquid tank 120. The changeover valve 128 changes one of the ink collecting paths to the other, so that the other waste liquid tank 120 is coupled to the liquid feed pumps 122 and 123.

In case the ink collecting mechanism 96 has two waste liquid tanks 120, the changeover valve 128 changes one of the ink collecting paths to the other based on the detection result of the ink level detecting mechanism 127 so as to have the ink collected by either one of the two waste liquid tanks 120. After the two waste liquid tanks 120 are replaced with empty waste liquid tanks 120, more time may be invested before both of them are filled up with the inks. This may allow for less frequent replacement of the waste liquid tanks 120 and accordingly facilitate maintenance of the three-dimensional object manufacturing apparatus 1. During the replacement of one of the waste liquid tanks 120, the three-dimensional object manufacturing apparatus 1 may continue to form the three-dimensional object using the other waste liquid tank 120. In case the ink collecting mechanism 96 has three or more waste liquid tanks 120, the changeover valve 128 changes one of the ink collecting paths to either one of the other paths based on the detection result of the ink level detecting mechanism 127 so as to have the ink collected by one of the three or more waste liquid tanks 120.

In the apparatus according to the earlier embodiment, the stage 3 may have three or more lifting mechanisms to move the table 2 upward and downward. In the three-dimensional object manufacturing apparatus 1 thus structured, before a three-dimensional object starts to be formed, the laser telemeter 49 measures distances in the vertical direction between the laser telemeter 49 and different positions on the upper surface of the table 2, and the three or more lifting mechanisms each independently move the table 2 upward or downward based on a measurement result of the laser telemeter 49 to correct inclination of the upper surface of the table 2 (upper surface of the object-shaping table 26) relative to the horizontal plane at the time of starting to form the three-dimensional object. The three-dimensional object manufacturing apparatus 1 forms a base for a three-dimensional object on the upper surface of the table 2 using the support material to lessen any impact from undulation of the upper surface of the table 2. On the upper surface of the table 2, the base is formed so that its upper surface is parallel to the horizontal plane. Based on the measurement result of the laser telemeter 49, the three or more lifting mechanisms each independently move the table upward or downward so as to correct inclination of the upper surface of the table 2 relative to the horizontal plane at the time of starting to form the three-dimensional object. In the three-dimensional object manufacturing apparatus 1 thus further characterized, the base formed on the upper surface of the table 2 may be reduced in thickness and accordingly formed more quickly, in contrast to any apparatus lacking such a mechanism to correct inclination of the table's upper surface relative to the horizontal plane.

While the laser telemeter 49 detects the shape of the three-dimensional object currently formed in the earlier embodiment, a camera, for example, may be used to detect the shape of the three-dimensional object currently formed. Thus, a camera is an example of the shape detecting mechanism provided to detect the shape of the three-dimensional object currently formed. The three-dimensional object manufacturing apparatus 1 described in the earlier embodiment may further include a broadcast system. In case the three-dimensional object manufacturing apparatus 1 is halted when determined that the currently formed object is not shaped according to the design data, the broadcast system broadcasts the event.

In the earlier embodiment, the stage driving mechanisms 9 move the table 2 in the front-rear direction during the manufacture of the three-dimensional object, and moves the table 2 to the front end of the three-dimensional object manufacturing apparatus 1 at the time of removing the formed object from the three-dimensional object manufacturing apparatus 1. The three-dimensional object manufacturing apparatus 1 may be equipped with two separate moving mechanisms; one for moving the table 2 in the front-rear direction during the manufacture of the three-dimensional object, and the other for moving the table 2 to the front end of the three-dimensional object manufacturing apparatus 1 at the time of removing the formed object from the three-dimensional object manufacturing apparatus 1.

In the carriage 5 are mounted, from the left to right in the mentioned order, one of the ultraviolet irradiators 60, flattening roller unit 62, inkjet head 51, inkjet head 52, inkjet head 53, inkjet head 54, inkjet head 55, inkjet head 56, inkjet head 57, inkjet head 58, and the other ultraviolet irradiator 60. Instead, the inkjet heads 51 to 58, ultraviolet irradiators 60, and flattening roller unit 62 may be mounted in the carriage 5 in an order optionally decided in the left-right direction.

What is claimed is:

1. An apparatus for manufacturing a three-dimensional object, comprising:
   a table on which the three-dimensional object is formable;
   a modeling material head that ejects an ink for object shaping toward the table;
   a modeling ink tank storing the ink for object shaping and connected to the modeling material head, the ink for object shaping being a white ink or a clear ink;
   support material heads that eject an ink for supporting the three-dimensional object toward the table and comprise a first support material head and a second support material head;
   a first support ink tank storing the ink for supporting and connected to the first support material head;
   a second support ink tank storing the ink for supporting and connected to the second support material head;
   a color ink head that ejects an ink that is colored toward the table and comprises a plurality of color ink heads each ejecting the ink that is colored different from each other;
   a plurality of color ink tanks each storing the ink that is colored different from each other, each of the plurality of color ink tanks being connected to each of the plurality of color ink heads;
   curing units that cure the inks on the table and comprise a first curing unit and a second curing unit;
   a flattening roller unit having a flattening roller that flattens surfaces of the inks on the table; and
   a carriage mounted with the modeling material head, the support material heads, the color ink head, the curing units, and the flattening roller unit,
   the ink for supporting supports a shape of the three-dimensional object during the manufacture of the three-dimensional object and is removed after the manufacture of the three-dimensional object,
   the ink for object shaping, the ink that is colored and the ink for supporting are ultraviolet-curable inks,
   the curing units radiate ultraviolet light having a wavelength to cure all of the ink for object shaping, the ink that is colored and the ink for supporting, and
   the first curing unit, the flattening roller unit, the first support material head, the modeling material head, the color ink head, the second support material head, and the second curing unit are arranged and mounted in the carriage in this order from one side to another side in a main scanning direction orthogonal to a vertical direction, and the color ink head is not arranged between the flattening roller unit and the modeling material head.

2. The apparatus according to claim 1, further comprising an ink mist adsorbing mechanism that adsorbs ink mist generated when the inks are ejected from the modeling material head, the support material heads, and the color ink head, the ink mist adsorbing mechanism comprising:
   a suctioning fan that suctions the ink mist; and
   a filter disposed at a position on a traveling path of the ink mist suctioned by the suctioning fan, wherein
   the ink mist adsorbing mechanism is mounted in the carriage.

3. The apparatus according to claim 1, further comprising:
   a table support that supports the table in a manner that the table is movable upward and downward; and
   a lifting mechanism that moves the table upward and downward relative to the table support, wherein
   the table comprises:
   an object-shaping table having an upper surface on which the three-dimensional object is formable; and
   an object-shaping table holder that holds the object-shaping table, the object-shaping table holder being supported by the table support so as to move upward and downward, and
   the object-shaping table is detachably attached to the object-shaping table holder.

4. The apparatus according to claim 3, wherein the object-shaping table has a flat rectangular shape, and
   the object-shaping table comprises a reinforcing rib formed in a grid-like or honeycomb fashion on a lower surface of the object-shaping table.

5. The apparatus according to claim 1, further comprising a moving mechanism that moves the table toward a front side in a front-rear direction until a position is reached at which the table is located more toward the front side than the carriage, wherein
   the front-rear direction is a direction orthogonal to the vertical direction and the main scanning direction.

6. The apparatus according to claim 5, wherein the moving mechanism moves the table in the front-rear direction during the manufacture of the three-dimensional object.

7. The apparatus according to claim 1, further comprising:
   a table support that supports the table in a manner that the table is movable upward and downward;
   a lifting mechanism that moves the table upward and downward relative to the table support; and
   a moving mechanism that moves the table support in the front-rear direction, wherein
   the front-rear direction is a direction orthogonal to the vertical direction and the main scanning direction.

8. The apparatus according to claim 1, further comprising:
   a shape detecting mechanism that detects a shape of the three-dimensional object currently formed; and
   a controller programmed to control the apparatus, wherein
   during the manufacture of the three-dimensional object, the controller compares the shape of the three-dimensional object currently formed and specified based on a detection result of the shape detecting mechanism to design data of the three-dimensional object, and
   the controller halts the apparatus when the controller determines that the three-dimensional object is not shaped according to the design data.

9. The apparatus according to claim 8, wherein the shape detecting mechanism is mounted in the carriage.

10. The apparatus according to claim 1, further comprising a telemeter mountable in the carriage, wherein
    the telemeter measures a distance in the vertical direction between the telemeter and an upper surface of the table.

11. The apparatus according to claim 10, further comprising:
    a carriage driving mechanism that moves the carriage in the main scanning direction;
    a moving mechanism that moves the table in the front-rear direction; and
    a lifting mechanism that moves the table upward and downward, wherein
    before the three-dimensional object starts to be formed, the carriage driving mechanism moves the carriage in the main scanning direction,
    the moving mechanism moves the table in the front-rear direction, the telemeter measures distances in the vertical direction between the telemeter and a plurality of positions on the upper surface of the table, and the lifting mechanism moves the table upward or downward based on a measurement result of the telemeter to set a height of the upper surface of the table at the time of starting to form the three-dimensional object.

12. The apparatus according to claim 10, further comprising:

a carriage driving mechanism that moves the carriage in the main scanning direction;

a moving mechanism that moves the table in the front-rear direction; and at least three lifting mechanisms that move the table upward and downward, wherein before the three-dimensional object starts to be formed, the carriage driving mechanism moves the carriage in the main scanning direction, the moving mechanism moves the table in the front-rear direction, the telemeter measures distances in the vertical direction between the telemeter and a plurality of positions on the upper surface of the table, and the at least three lifting mechanisms each independently move the table upward or downward based on a measurement result of the telemeter to correct inclination of the upper surface of the table relative to a horizontal plane at the time of starting to form the three-dimensional object.

13. The apparatus according to claim 1, further comprising:

a plurality of ink collecting tanks in which at least the inks removed from the flattening roller are collectible;

an ink level detecting mechanism that detects ink levels in the plurality of ink collecting tanks; and a changeover valve to which the plurality of ink collecting tanks are coupled through pipping, wherein the changeover valve changes one of ink collecting paths to another ink collecting path based on a detection result of the ink level detecting mechanism so as to have the inks collected in one of the plurality of ink collecting tanks.

14. The apparatus according to claim 1, wherein the modeling material head at least includes a head that ejects the white ink or a head that ejects the clear ink.

15. The apparatus according to claim 2, further comprising a moving mechanism that moves the table toward a front side in a front-rear direction until a position is reached at which the table is located more toward the front side than the carriage, wherein the front-rear direction is a direction orthogonal to the vertical direction and the main scanning direction.

16. The apparatus according to claim 3, further comprising a moving mechanism that moves the table toward a front side in a front-rear direction until a position is reached at which the table is located more toward the front side than the carriage, wherein the front-rear direction is a direction orthogonal to the vertical direction and the main scanning direction.

17. The apparatus according to claim 4, further comprising a moving mechanism that moves the table toward a front side in a front-rear direction until a position is reached at which the table is located more toward the front side than the carriage, wherein the front-rear direction is a direction orthogonal to the vertical direction and the main scanning direction.

18. The apparatus according to claim 2, further comprising:

a table support that supports the table in a manner that the table is movable upward and downward;

a lifting mechanism that moves the table upward and downward relative to the table support; and a moving mechanism that moves the table support in the front-rear direction, wherein the front-rear direction is a direction orthogonal to the vertical direction and the main scanning direction.

19. The apparatus according to claim 3, further comprising:

a moving mechanism that moves the table support in the front-rear direction, wherein the front-rear direction is a direction orthogonal to the vertical direction and the main scanning direction.

20. The apparatus according to claim 1, further comprising a controller programmed to control the apparatus, wherein the controller controls only the first curing unit, the flattening roller unit, the first support material head and the modeling material head to reciprocate above the table in the main scanning direction when the three-dimensional object is not colored.

* * * * *